(12) United States Patent
Tashiro

(10) Patent No.: US 6,207,256 B1
(45) Date of Patent: Mar. 27, 2001

(54) SPACE TRUSS COMPOSITE PANEL

(75) Inventor: Kan Tashiro, Miyagi-ken (JP)

(73) Assignee: S. Iwasa, Miyagi-ken (JP); a part interest ( * ) Notice: Subject to any disclaimer, the term of this patent is extended or adjusted under 35 U.S.C. 154(b) by 0 days.

(21) Appl. No.: 09/162,736

(22) Filed: Sep. 29, 1998

(30) Foreign Application Priority Data

Oct. 2, 1997 (JP) ............................................. 9-86090
Aug. 24, 1998 (JP) ............................................ 10-37085

(51) Int. Cl.[7] ............................... B32B 3/10; B32B 3/12; E04C 2/34; E04C 2/36; E04F 15/06
(52) U.S. Cl. ..................... 428/178; 428/132; 428/136; 428/116; 428/117; 428/118; 428/596; 428/597; 52/791.1; 52/673; 52/670; 52/675; 52/789.1
(58) Field of Search ................... 52/790.1, 793.11, 52/690, 673, 660, 670, 675, 789.1, 791.1; 428/178, 134, 136, 138, 177, 132, 116, 117, 118, 596, 597

(56) References Cited

U.S. PATENT DOCUMENTS

| 3,673,057 | 6/1972 | Fairbanks | 161/68 |
| 5,958,551 | * 9/1999 | Garcia-Ochoa | 428/137 |

* cited by examiner

*Primary Examiner*—Rena L. Dye
*Assistant Examiner*—Laura L. Lee
(74) *Attorney, Agent, or Firm*—Martin Smolowitz

(57) ABSTRACT

A space truss composite panel is excellent in structural mechanics and capable of being efficiently and economically produced. The space truss composite panel has a construction in which a sheet 1 provided with a series of slits 2 is formed into a space framework 3 through a press working. The space framework 3 is provided with a series of polygonal unit lattices in one of its opposite sides and a series of polygonal pyramids in the other of the opposite sides, wherein each of the polygonal unit lattices has an intersection of its adjacent sides 3a, 3a connected with a ridgeline portion 3b of each of the polygonal pyramids, and the space framework 3 has at least one of its opposite sides connected with a board-like member 4.

9 Claims, 33 Drawing Sheets

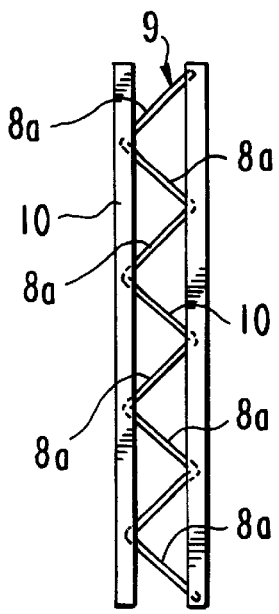
FIG.38
FIG.39
FIG.40
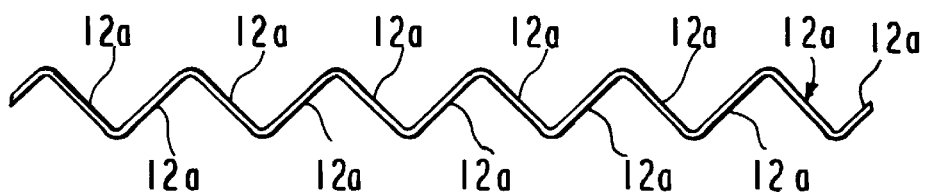

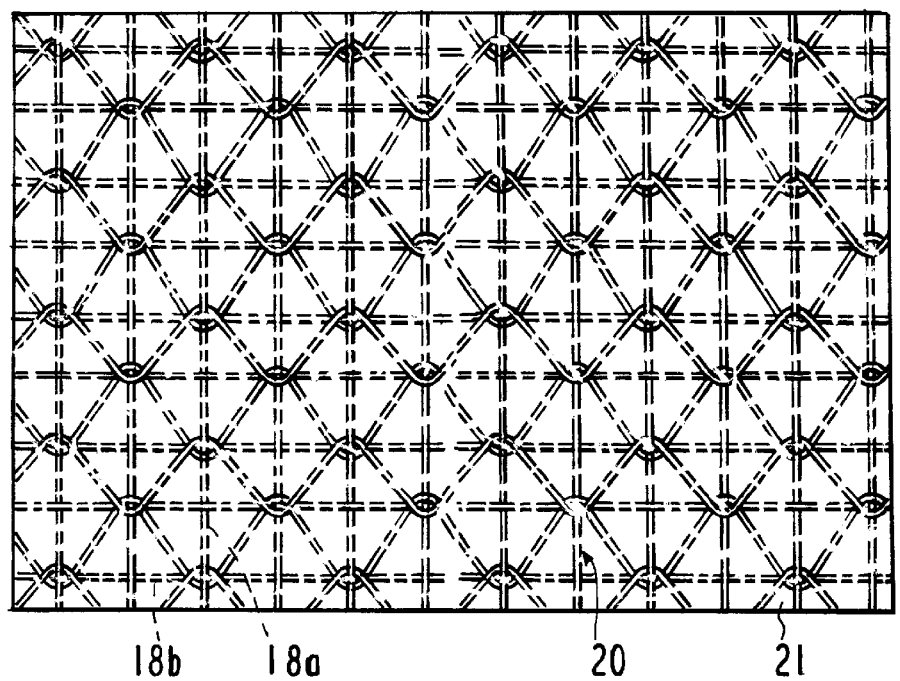
F I G. 65
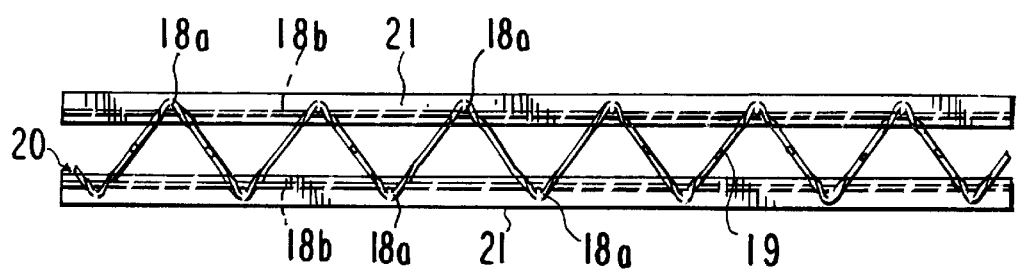
F I G. 66

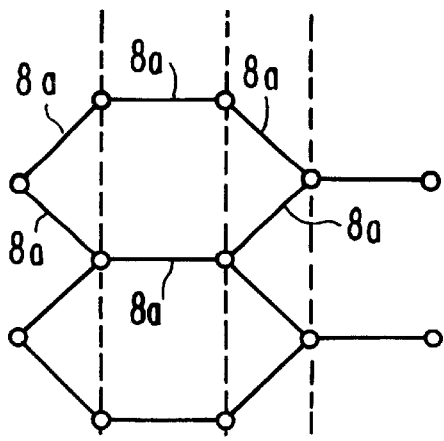
FIG.68a
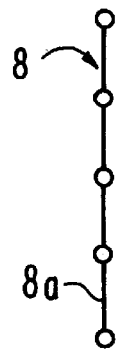
FIG.68b
FIG.68c
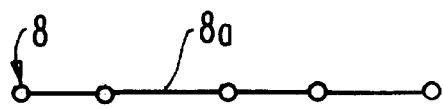
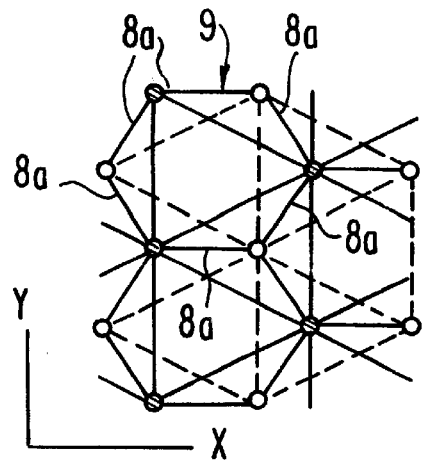
FIG.69a
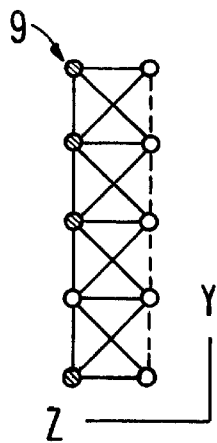
FIG.69c
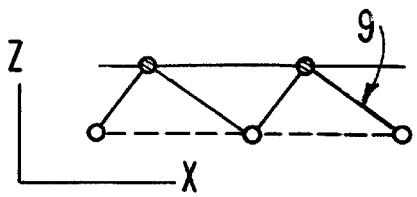
FIG.69b

SPACE TRUSS COMPOSITE PANEL

BACKGROUND OF THE INVENTION

1. Field of the Invention

The present invention relates to a space truss composite panel that lends itself to industrial production.

The space truss composite panel is utilized as a formwork for poured-concrete construction in construction work, a half precast concrete board, a temporary deck, a scaffold board, a pallet for transportation, and the like. Further, the space truss composite panel is utilized also as various panels and boards for forming the structures or surfaces of roofs in buildings, floors, and fittings. Still further, the space truss composite panel is utilized also as flat- and curved-surface construction in fences, furniture, containers, the bodies of vehicles, the hulls of vessels, the hulls of airplanes, and the like.

2. Description of the Related Art

A conventional space truss framework has a construction in which one side of the truss is formed as a single member by connecting a plurality of members with each other through a connector at a node of the truss, each of the members being connected by means of welding, bolts, screws, or the like.

When the space truss framework is decreased in height, the number of nodes thereof drastically increase in proportion to the second power of its size. Due to this, from an economical point of view, it is impossible to produce the space truss framework which is low in height. A commonly-constructed space truss framework has a height of more than or equal to 300 mm. Up to this time, any space truss framework with a height of less than 300 mm has not been produced yet. Particularly, since it is impossible to produce a space truss with a height of from several to several tens of millimeters on a large-scale basis, any space truss composite panel has not been produced yet.

SUMMARY OF THE INVENTION

Although a space truss framework is a mechanically advantageous structural framework, it is difficult to construct. Consequently, it is an object of the present invention to provide a space truss composite panel, which has a predetermined structural strength and is capable of being efficiently and economically produced.

According to a first aspect of the present invention, the above object of the invention is accomplished by providing:

A space truss composite panel having a construction in which a sheet provided with a series of slits is formed into a space framework through a press working, the space framework being provided with a series of polygonal unit lattices in one of its opposite sides and a series of polygonal pyramids in the other of the opposite sides, wherein each of the polygonal unit lattices has an intersection of its adjacent sides connected with a ridgeline portion and a flat vertex portion of each of the polygonal pyramids, and the space framework has at least one of its opposite sides connected with a board-like member.

According to a second aspect of the present invention, the above object of the invention is accomplished by providing:

A space truss composite panel having a construction in which a lattice element is provided with a series of triangular unit lattices each of which has a basal side portion, wherein the lattice element is subjected to a plurality of alternating bending operations along a plurality of parallel lattice lines each of which is parallel to the basal side portion, so that a plurality of alternating ridge and trough portions are formed in the lattice element, six adjacent triangles share four opposite side portions with each other, the opposite side portions having their front-end portions connected with each other on the lattice lines, whereby a corrugated lattice-like space core is formed in a manner such that each of the opposite side portions forms a ridgeline portion of a quadrilateral pyramid, the space core having at least one of its opposite sides connected with a board-like member.

According to a third aspect of the present invention, the above object of the invention is accomplished by providing:

A space truss composite panel having a construction in which a lattice element comprises a series of quadrilateral or hexagonal unit lattices, and is subjected to a bending operation at each of intersections or sides of the unit lattices, whereby the lattice element is formed into a corrugated lattice-like space core which has at least one of its opposite sides connected with a board-like member.

According to a fourth aspect of the present invention, the above object of the invention is accomplished by providing:

The space truss composite panel as set forth in the third aspect of the present invention, wherein:

the lattice element comprising a series of the quadrilateral or the hexagonal unit lattices is subjected to alternating bending operations at a plurality of parallel diagonal lines each of which is parallel to a diagonal line of each of the quadrilateral or the hexagonal unit lattices, so that alternating ridge and trough portions are formed in the lattice element, whereby the lattice element is formed into the corrugated lattice-like space core in a manner such that four side portions shared by adjacent four quadrilaterals, or three side portions shared by adjacent three hexagons have their front-end portions connected with each other on the parallel diagonal lines, and that each of the side portions forms each of ridgeline portions of quadrilateral pyramids or of triangular pyramids.

According to a fifth aspect of the present invention, the above object of the invention is accomplished by providing:

A space truss composite panel having a construction in which a straight member is formed into a corrugated member through a bending operation in a manner such that the corrugated member has its oblique portions alternately reversed in inclination, wherein the corrugated member has its corruaged surface disposed vertically, and a pair of the corrugated members which are different in direction from each other are so disposed as to intersect with each other at their bent portions to form intersections, whereby a corrugated lattice-like space core is formed in a manner such that four of the oblique portions adjacent to each of the intersections form ridgeline portions of a quadrilateral pyramid, the space core having each of its opposite surfaces connected with a board-like member.

According to a sixth aspect of the present invention, the above object of the invention is accomplished by providing:

A space truss composite panel having a construction in which a straight member is formed into a corrugated member through a bending operation in a manner such that the corrugated member has its oblique portions alternately reversed in inclination, wherein the corrugated member has its corruaged surface disposed vertically, and a pair of the corrugated members which are different in direction from each other are so disposed as to intersect with each other at their bent portions to form intersections, whereby a corrugated lattice-like space core comprised of a plurality of corrugated unit lattices is formed in a manner such that four of the oblique portions adjacent to each of the intersections form ridgeline portions of a quadrilateral pyramid, wherein at least one of additional straight members which are different in direction from each other is disposed in a manner such that the additional straight member connects vertexes of the corrugated unit lattices, the vertexes lying on polygonal lines of the corrugated unit lattices, whereby all the intersections of the additional straight member are connected with the space core.

According to a seventh aspect of the present invention, the above object of the invention is accomplished by providing:

A space truss composite panel having a construction in which a straight member is formed into a corrugated member through a bending operation in a manner such that the corrugated member has its oblique portions alternately reversed in inclination, wherein the corrugated member has its corruaged surface disposed vertically, and a pair of the corrugated members which are different in direction from each other are so disposed as to intersect with each other at their bent portions to form intersections, whereby a corrugated lattice comprised of a plurality of corrugated unit lattices is formed in a manner such that four of the oblique portions adjacent to each of the intersections form ridgeline portions of a quadrilateral pyramid, wherein at least one of additional straight members which are different in direction from each other is disposed in a manner such that the additional straight member connects vertexes of the corrugated unit lattices, the vertexes lying on polygonal lines of the corrugated unit lattices, whereby all the intersections of the additional straight member are connected with the corrugated lattice to form a space truss framework which has at least one of its opposite sides connected with a board-like member.

According to an eighth aspect of the present invention, the above object of the invention is accomplished by providing:

A space truss composite panel having a construction in which a pair of planar lattices each of which is formed by crossing a longitudinal fiber and a lateral fiber or by crossing warp and woof are vertically spaced apart from each other, wherein adjacent three of intersections of the pair of planar lattices thus vertically spaced apart from each other are connected with each other through an oblique fiber or an oblique thread in a manner such that the adjacent three thus connected with each other through the oblique fiber or the oblique thread form a triangle, thereby providing more rigidity in the fiber or in the thread.

According to a ninth aspect of the present invention, the above object of the invention is accomplished by providing:

A space truss composite panel having a construction in which a pair of planar lattices each of which is comprised of a longitudinal fiber and a lateral fiber are vertically spaced apart from each other, wherein adjacent three of intersections of the pair of planar lattices thus vertically spaced apart from each other are connected with each other through an oblique fiber or an oblique thread in a manner such that the adjacent three thus connected with each other through the oblique fiber or the oblique thread form a triangle, thereby providing more rigidity in the fiber or in the thread, and thereby producing a space truss framework which has at least one of its opposite sides connected with a board-like member.

In the present invention according to any one of the above-mentioned aspects, it is possible to simultaneously connect the space truss framework or space core with the board-like members at all the nodes thereof as a whole. Particularly, as for material of the board-like member, when a suitable mixture or fluid material capable of solidifying is selected as such material of the board-like member and each of the nodes aligned with each other in the same plane as that of the space framework or of the space core is embedded in the material of the board-like member so as to be fixed thereto after completion of solidification of the material, it is possible to automatically and efficiently connect the nodes with each other.

By connecting such space truss framework or space core with the board-like members, it is possible to construct the space truss composite panel which is light in weight and excellent in strength.

BRIEF DESCRIPTION OF THE DRAWINGS

FIG. 38 is a right side view of the space truss composite panel shown in FIG. 36;

FIG. 39 is a front view of the straight member used for fabricating the corrugated member which is used in a fifth embodiment of the present invention;

FIG. 40 is a front view of the corrugated member fabricated through the bending operation of the straight member shown in FIG. 39;

FIG. 65 is a front view of the space truss composite panel according to a ninth embodiment of the present invention;

FIG. 66 is a bottom view of the space truss composite panel shown in FIG. 65;

FIG. 68($a$) is a front view of the lattice element used in a tenth embodiment of the present invention;

FIG. 68($b$) is a plan view of the lattice element shown in FIG. 68($a$);

FIG. 68($c$) is a right side view of the lattice element shown in FIG. 68($a$);

FIG. 69($a$) is a front view of the space core fabricated through the bending operation of the lattice element shown in FIG. 68($a$);

FIG. 69($b$) is a plan view of the space core shown in FIG. 69($a$);

FIG. 69($c$) is a right side view of the space core shown in FIG. 69($a$);

FIG. 70($b$) is a plan view of the lattice element shown in FIG. 70($a$);

FIG. 70($c$) is a right side view of the lattice element shown in FIG. 70($a$);

FIG. 71($b$) is a plan view of the space core shown in FIG. 71($a$); and

FIG. 71($c$) is a right side view of the space core shown in FIG. 71($a$).

DESCRIPTION OF THE PREFERRED EMBODIMENTS

Figure 1:
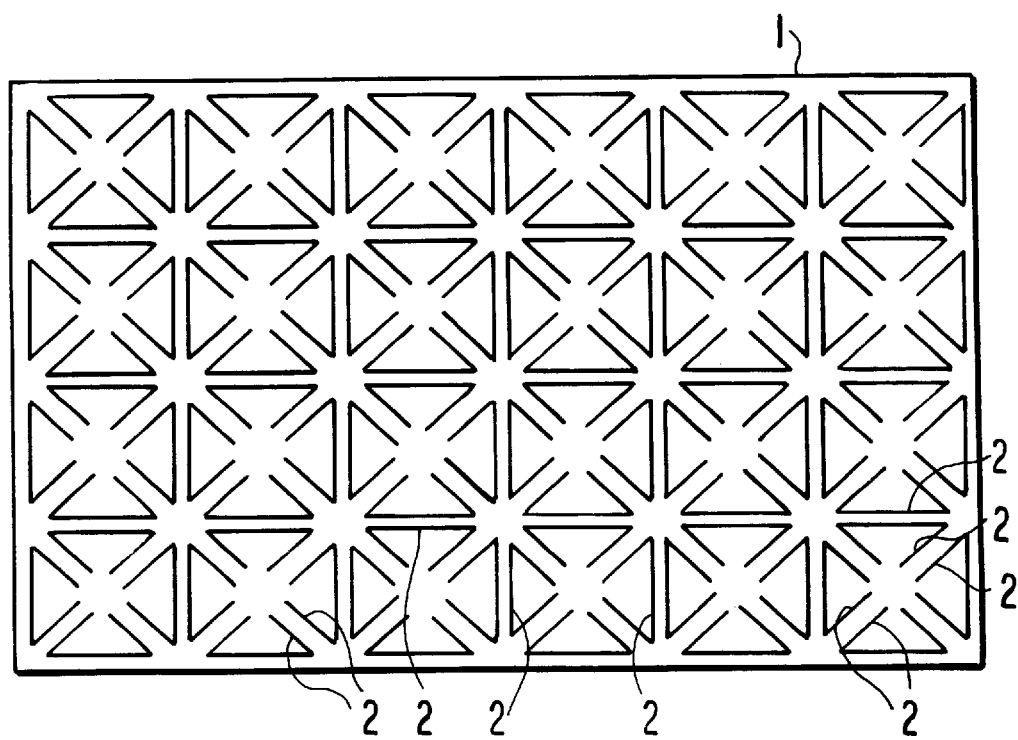
FIG. 1 is a front view of the sheet provided with the slits used in a first embodiment of the present invention.
Figure 2:
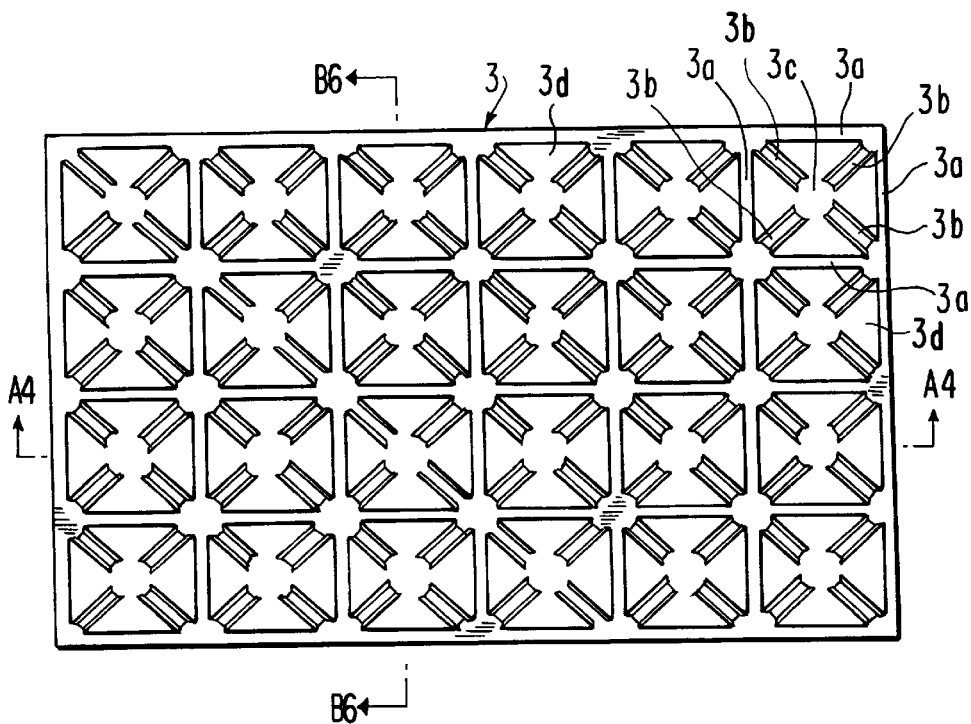
FIG. 2 is a front view of the space framework formed through the press working of the sheet shown in FIG. 1.
Figure 3:
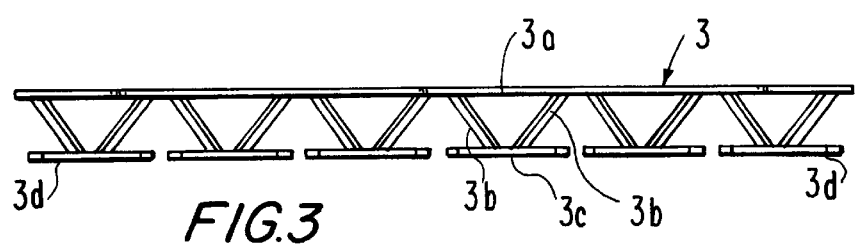
FIG. 3 is a bottom view of the space framework shown in FIG. 2.
Figure 4:
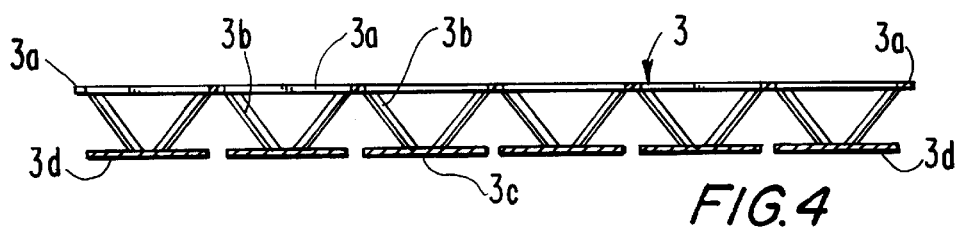
FIG. 4 is a cross-sectional view of the space framework, taken along the line A4—A4 of FIG. 2.
Figure 5:
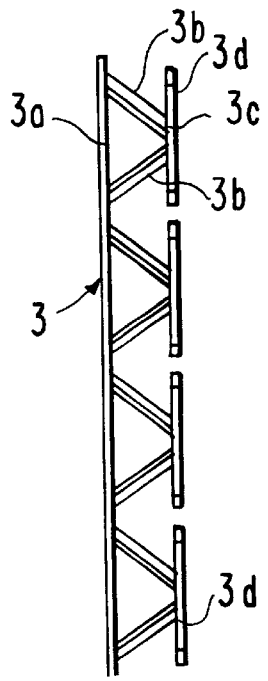
FIG. 5 is a right side view of the space framework shown in FIG. 2.
Figure 6:
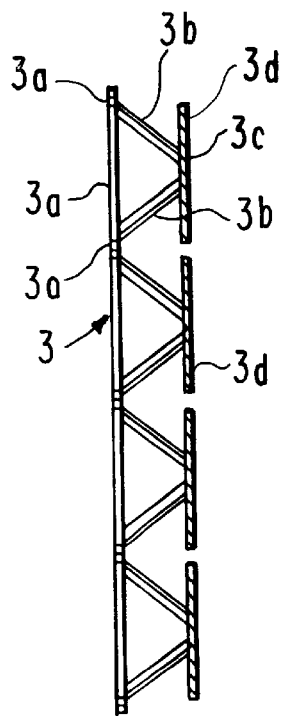
FIG. 6 is a cross-sectional view of the space framework, taken along the line B6—B6 of FIG. 2.
Figure 7:
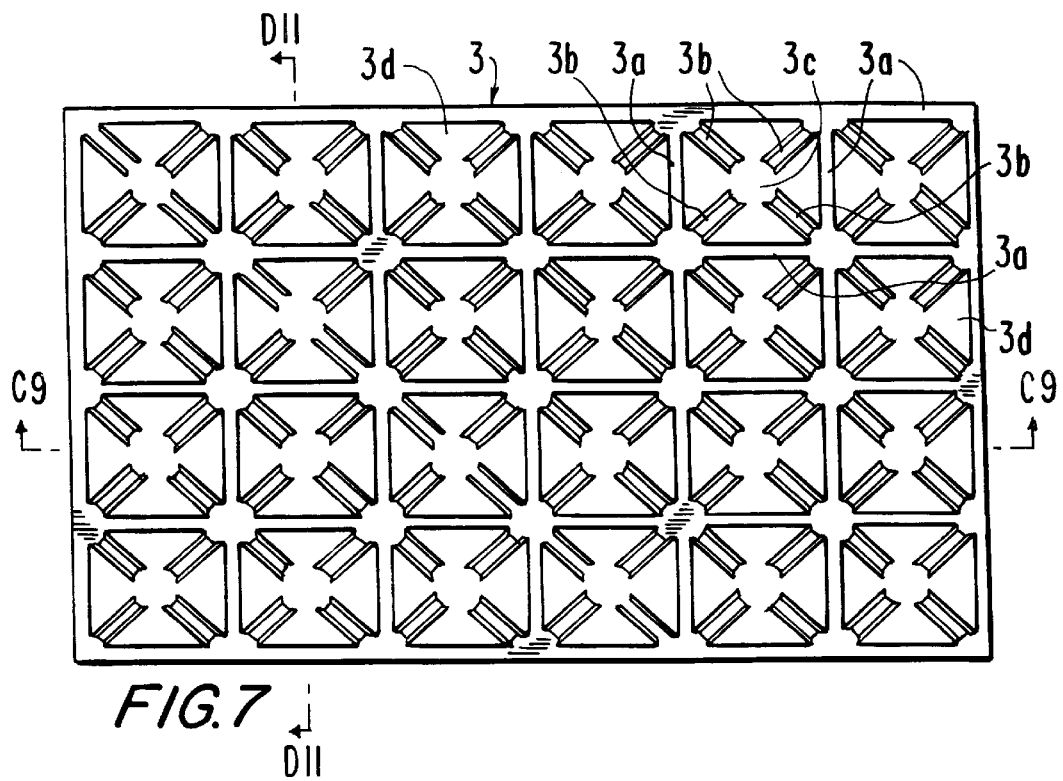
FIG. 7 is a front view of the space truss composite panel in which the space framework shown in FIG. 2 is connected with the board-like member.
Figure 8:
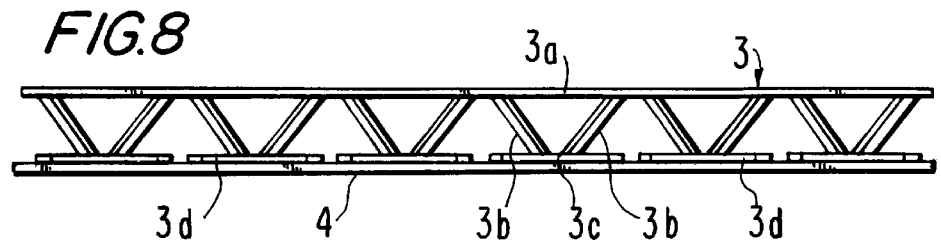
FIG. 8 is a bottom view of the space truss composite panel shown in FIG. 7.
Figure 9:
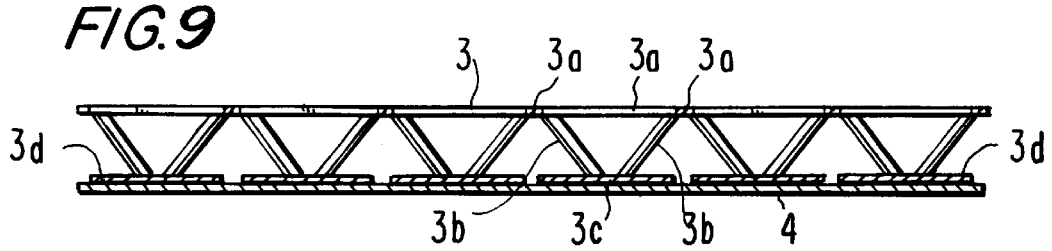
FIG. 9 is a cross-sectional view of the space truss composite panel, taken along the line C9—C9 of FIG. 7.
Figure 10:
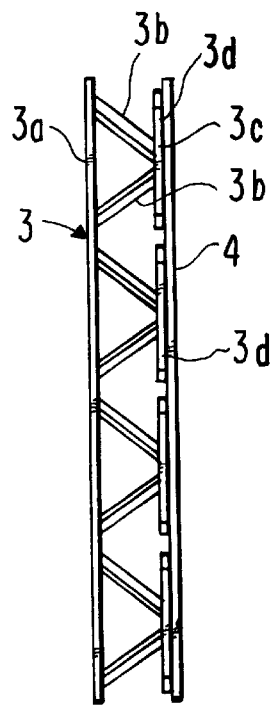
FIG. 10 is a right side view of the space truss composite panel shown in FIG. 7.
Figure 11:
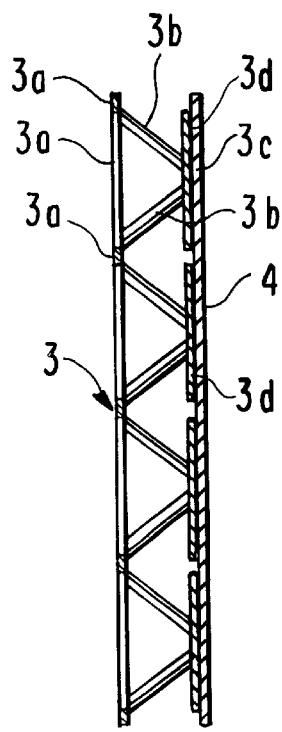
FIG. 11 is a cross-sectional view of the space truss composite panel, taken along the line D11—D11 of FIG. 7.
Figure 12:
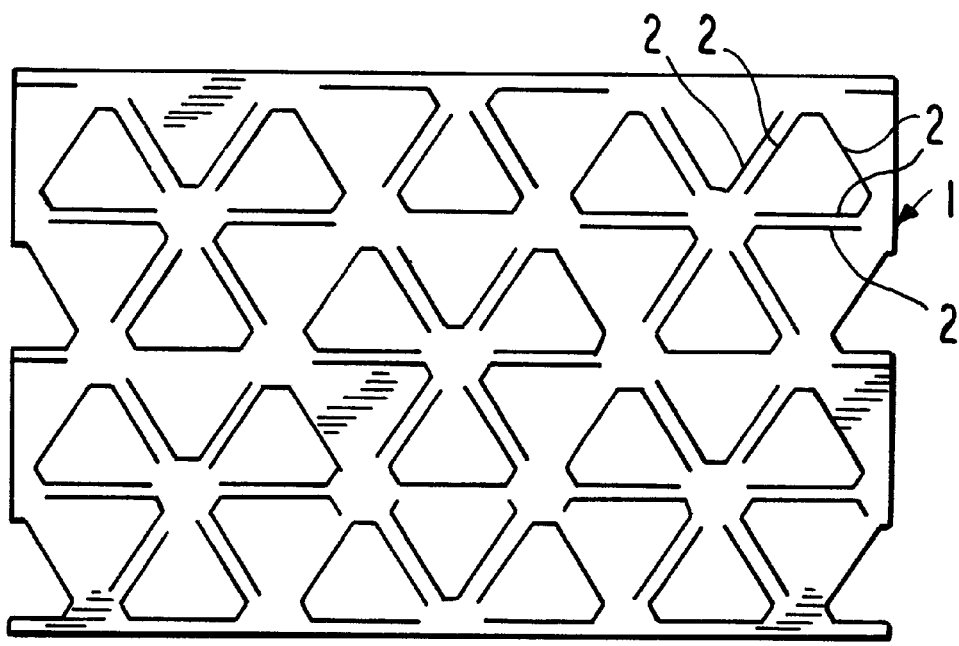
FIG. 12 is a front view of the sheet provided with the slits used in a second embodiment of the present invention.
Figure 13:
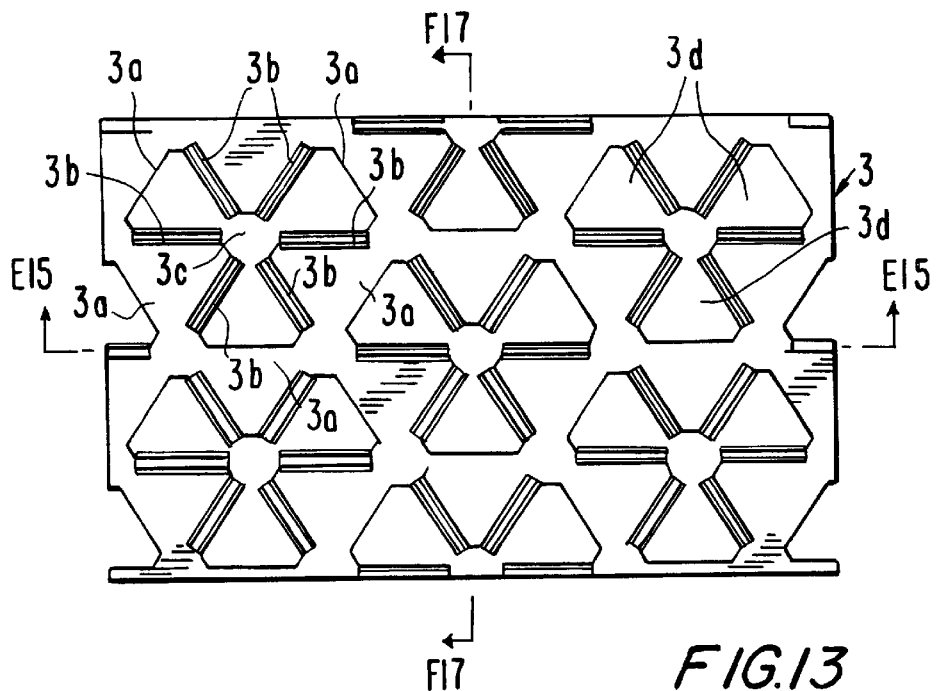
FIG. 13 is a front view of the space framework formed through the press working of the sheet shown in FIG. 12.
Figure 14:
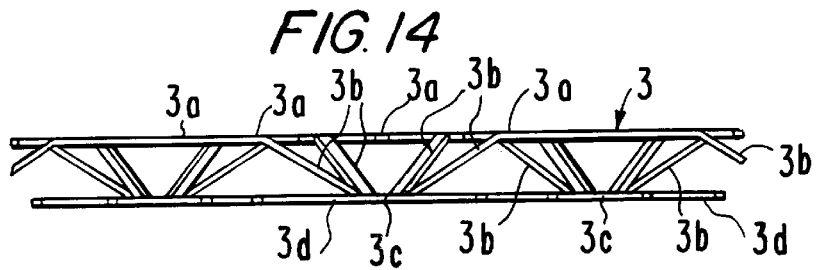
FIG. 14 is a bottom view of the space framework shown in FIG. 13.
Figure 15:
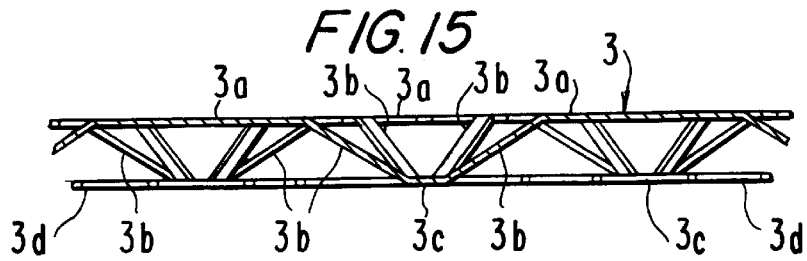
FIG. 15 is a cross-sectional view of the space framework, taken along the line E15—E15 of FIG. 13.
Figure 16:
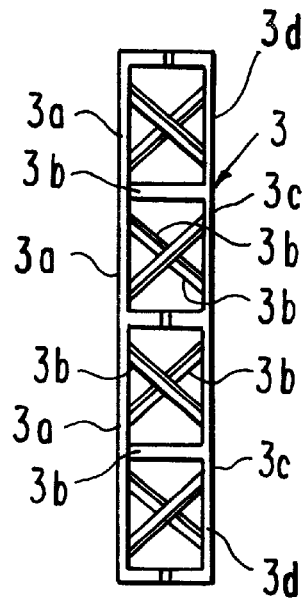
FIG. 16 is a right side view of the space framework shown in FIG. 13.
Figure 17:
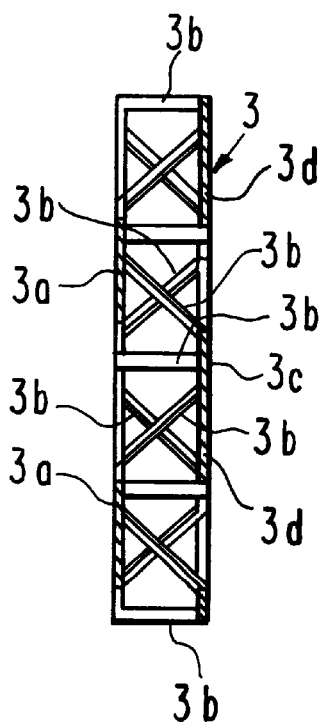
FIG. 17 is a cross-sectional view of the space framework, taken along the line F17—F17 of FIG. 13.
Figure 18:
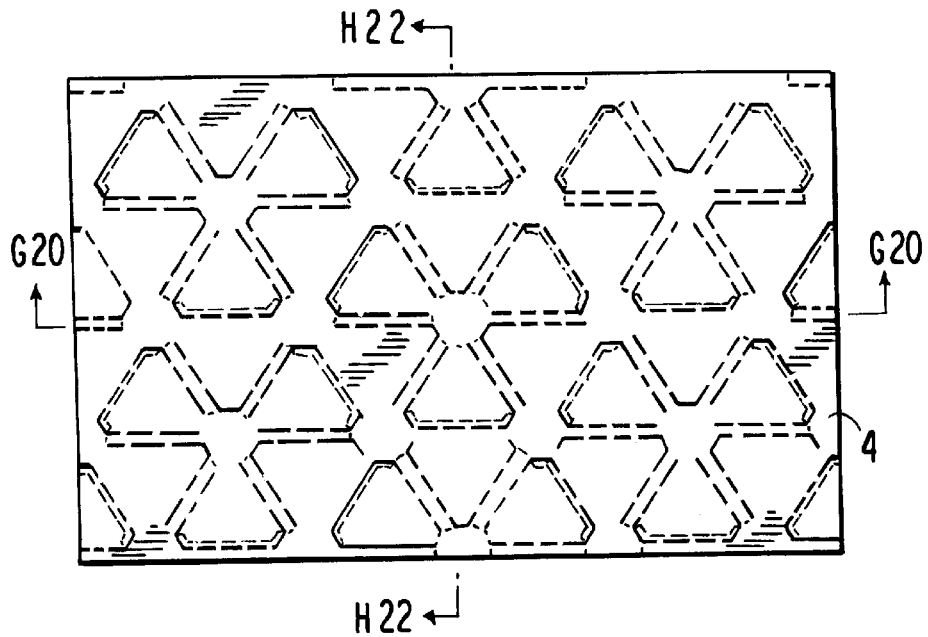
FIG. 18 is a front view of the space truss composite panel in which the space framework shown in FIG. 13 is connected with the board-like members.
Figure 19:
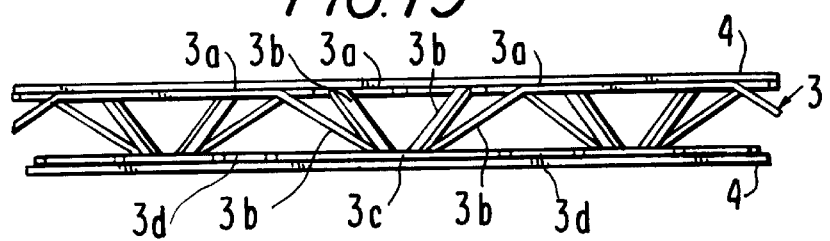
FIG. 19 is a bottom view of the space truss composite panel shown in FIG. 18.
Figure 20:
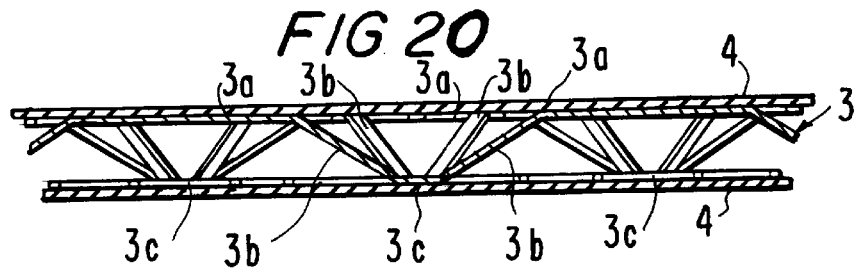
FIG. 20 is a cross-sectional view of the space truss composite panel, taken along the line G20—G20 of FIG. 18.
Figure 21:
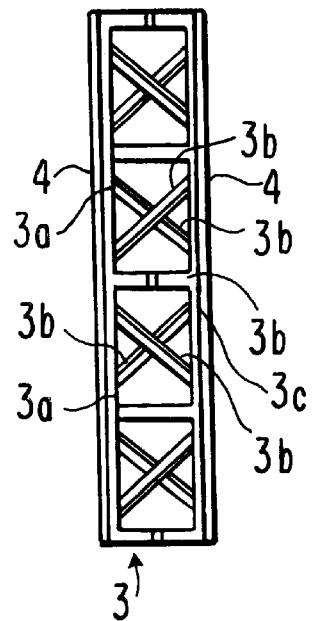
FIG. 21 is a right side view of the space truss composite panel shown in FIG. 18.
Figure 22:
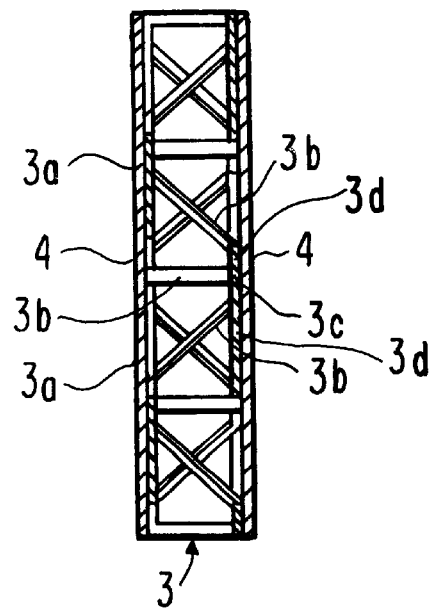
FIG. 22 is a cross-sectional view of the space truss composite panel, taken along the line H22—H22 of FIG. 18.
Figure 23:
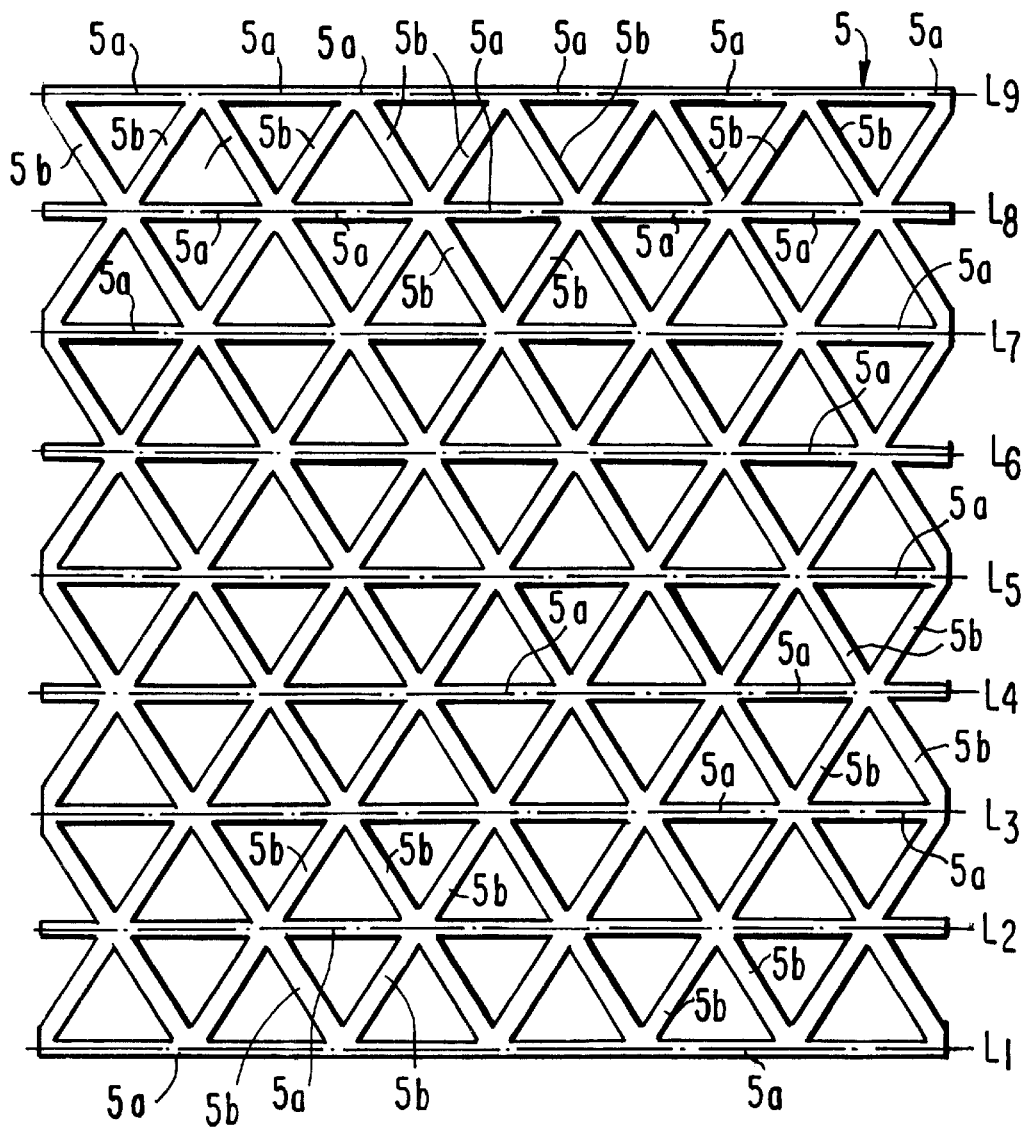
FIG. 23 is a front view of the lattice element used in a third embodiment of the present invention.
Figure 24:
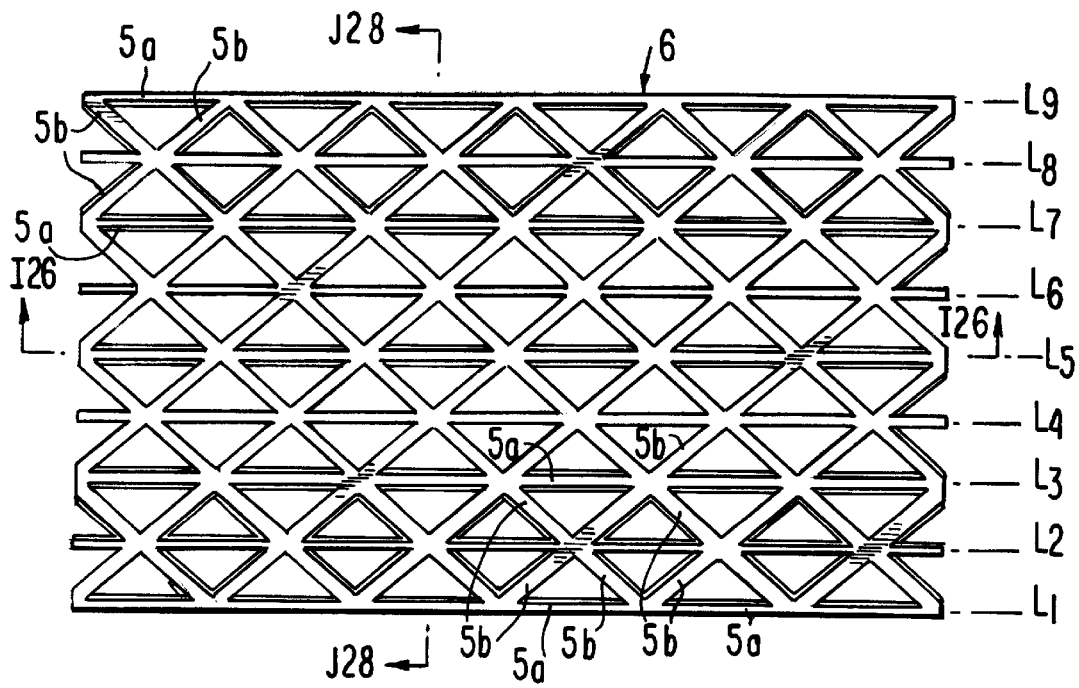
FIG. 24 is a front view of the space core formed through the bending operation of the lattice element shown in FIG. 23.
Figure 25:
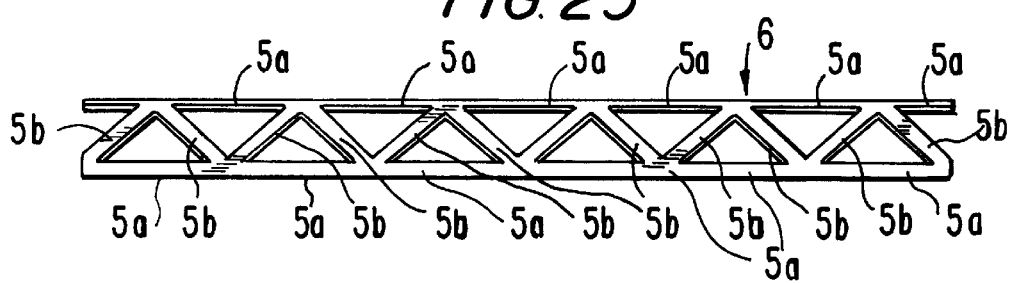
FIG. 25 is a bottom view of the space core shown in FIG. 24.
Figure 26:
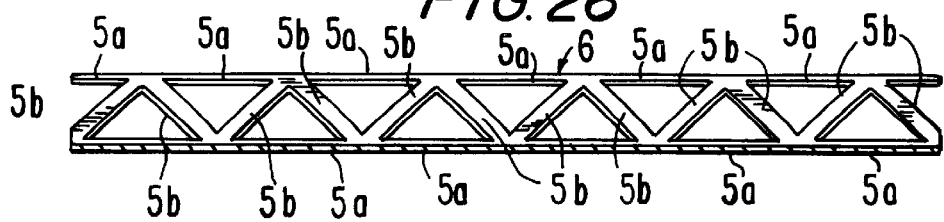
FIG. 26 is a cross-sectional view of the space core, taken along the line I26—I26 of FIG. 24.
Figure 27:
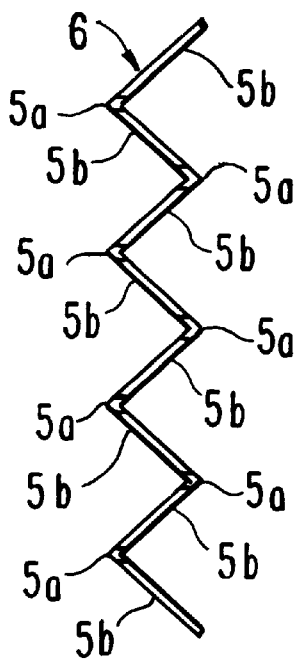
FIG. 27 is a right side view of the space core shown in FIG. 24.
Figure 28:
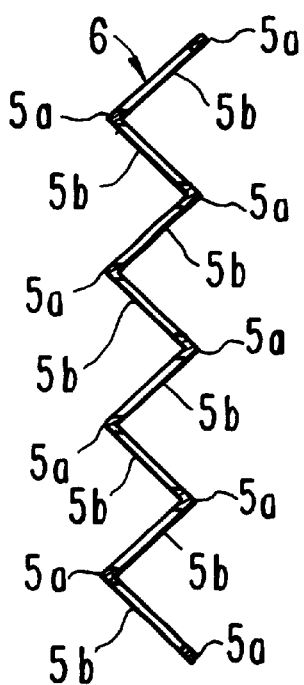
FIG. 28 is a cross-sectional view of the space core, taken along the line J28—J28 of FIG. 24.
Figure 29:
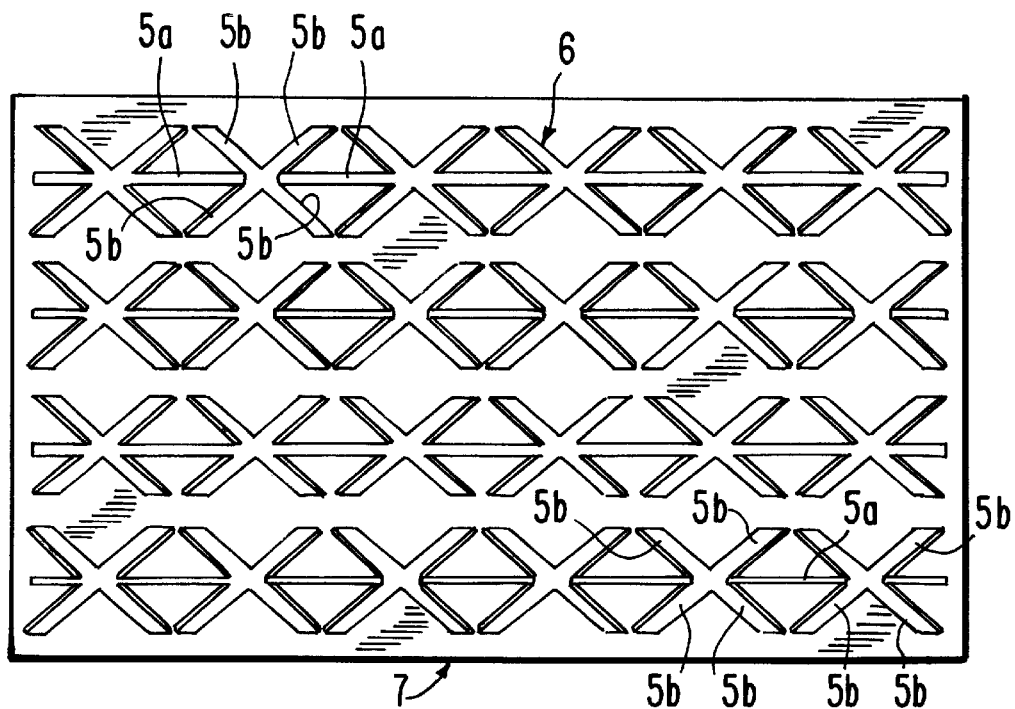
FIG. 29 is a front view of the space truss composite panel in which the space core shown in FIG. 24 is connected with the board-like member.
Figure 30:
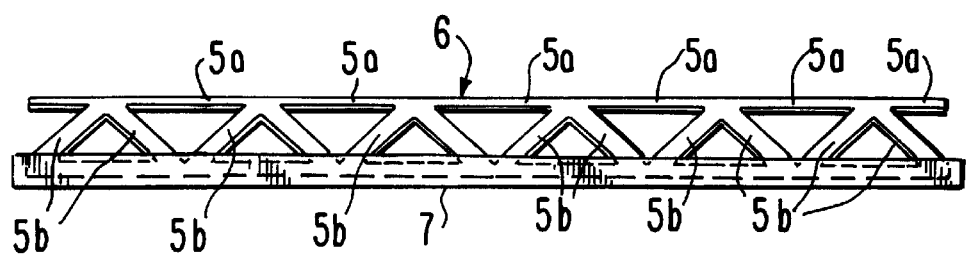
FIG. 30 is a bottom view of the space truss composite panel shown in FIG. 29.
Figure 32:
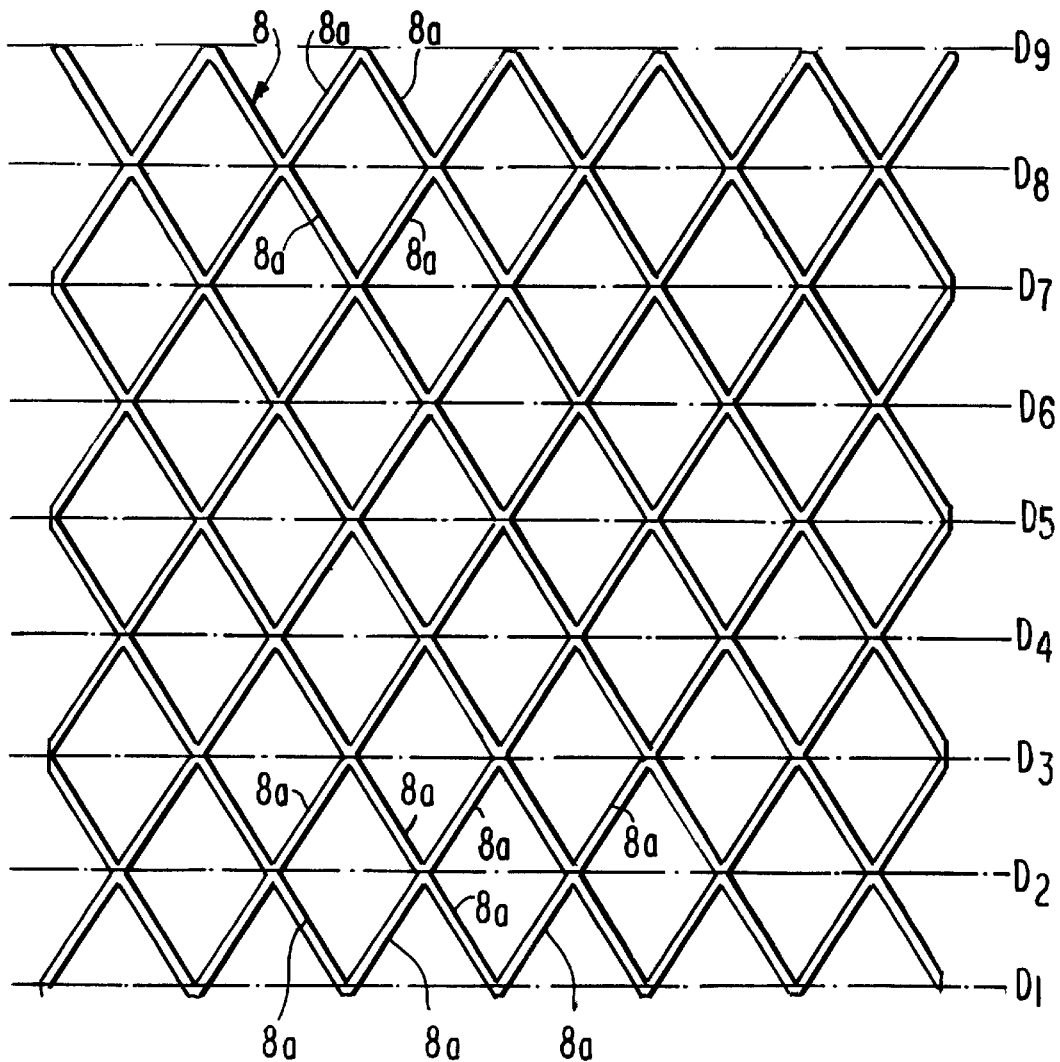
FIG. 32 is a front view of the lattice element used in a fourth embodiment of the present invention.
Figure 31:
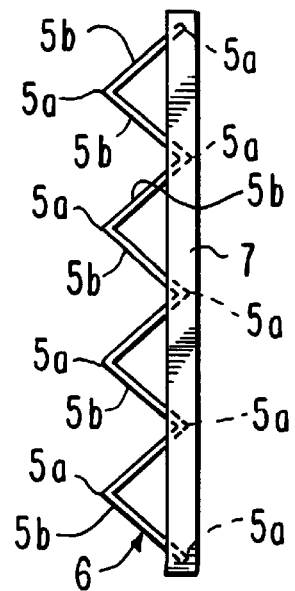
FIG. 31 is a right side view of the space truss composite panel shown in FIG. 29.

Hereinbelow, the present invention will be described in detail with reference to the accompanying drawings.

FIGS. 1 to 11 show a first embodiment of the present invention. In this first embodiment, a sheet 1 is constructed of a steel plate having a plurality of slits 2 which are so formed as to define a series of polygonal unit lattices which are quadrilateral. It is also possible to use triangular shaped openings in place of the slits 2 in the sheet 1, as is in a sheet of punching metal. The sheet 1 can be made of any material, for example such as other metals, synthetic resins and the like, provided that the material is sufficiently elastic and capable of being pressworked.

In the steel plate 1 provided with the slits 2, a central portion of the quadrilateral unit lattice is subjected to a press working in a condition in which longitudinal and lateral side portions 3a of the quadrilateral unit lattice are fixed, so that diagonal portions of the quadrilateral unit lattices are stretched while the quadrilateral pyramids are formed in a rear surface of the steel plate and project therefrom. The diagonal portions thus stretched in the above step form angeled ridgeline portions 3b of the quadrilateral pyramids.

A basal portion of the quadrilateral pyramid is connected with an intersection portion of the side portions 3a, 3a of the quadrilateral unit lattice, while a vertex portion of the quadrilateral pyramid forms a flat portion 3c from which four triangular shaped fins project in four directions to form a space framework. As a board-like member 4, a steel plate is used and connected with the above-mentioned flat portion 3c of the quadrilateral pyramid by means of welding, bonding, bolts, rivets and the like to form an alternative space framework 3.

FIGS. 12 to 22 show a second embodiment of the present invention. In this second embodiment, the sheet 1 is constructed of a steel plate provided with the slits 2 which are so formed as to define a series of hexagonal unit lattices. It is also possible to use triangular openings in place of the slits 2 in the sheet 1, as is in a sheet of punching metal. The sheet 1 can be made of any material, for example such as other metals, synthetic resins and the like, provided that the material is capable of being pressworked.

The steel plate 1 provided with the slits 2 has a central portion of its hexagonal unit lattice pressworked in a condition in which longitudinal and lateral side portions 3a of the hexagonaol unit lattice are fixed. Due to this, the hexagonal unit lattice has its diagonal portions stretched while projecting in a rear side of steel plate 1. The diagonal portions thus stretched form ridgeline portions 3b of a hexagonal pyramid.

A basal portion of the hexagonal pyramid is connected with an intersection of the side portions 3a, 3a of the hexagonal unit lattice, while a vertex portion of the hexagonal pyramid forms a flat portion 3c from which triangular fins 3d extend in three directions. Adjacent ones of the hexagonal unit lattices share their side portions 3a with each other. The side portion 3a remains in a triangular shape after completion of the press working.

As the board-like member 4, a steel plate is used. This board-like member 4 is connected with both the above-mentioned flat portions 3c of the hexagonal pyramids and the side portions 3a of the hexagonal unit lattices by means of welding, bolts, bonding, rivets and the like, so that a honeycomb sandwich panel constructed of the space trusses is produced.

FIGS. 23 to 31 show a third embodiment of the present invention. In this third embodiment, as a lattice element 5, a sheet of punching metal with triangular openings is used. Each of the opening portions of the lattice may assume any shape, for example such as polygons, circles, or the like, provided that the lattice has its lattice lines keep straight. As for the sheet of punching metal, it is made of any material, for example such as metals, synthetic resins, FRP, paper and the like, provided that the material for the sheet is capable of being subjected to a bending operation.

The lattice element 5 is bent to form a corrugated lattice-like space core. More particularly, the lattice element 5 is subjected to alternating bending operations in a manner such that its laterally extending parallel lattice lines $L_1, L_3, L_5, L_7, L_9$ . . . align with trough portions of the space core 6 while the remaining even number lattice lines $L_2, L_4, L_6, L_8$ . . . thereof align with ridge portions of the space core 6. In the-above alternating bending operations, it is possible to vary their bending angles in order to have the corrugated lattice form a curved surface.

The corrugated lattice-like space core 6 has its one side embedded in cement mortar which will form a board-like member 7 after curing. By curing the cement, it is possible to automatically connect the space core 6 with the board-like member 7, which makes it possible to construct a space truss composite panel.

FIGS. 32 to 38 show a fourth embodiment of the present invention. In this embodiment, as a lattice element 8, a sheet of expanded metal provided with quadrilateral openings is used. This sheet of expanded metal can be made of any bendable material, for example such as metals, synthetic resins, FRP and the like.

The lattice element 8 is bent to form a corrugated lattice-like space core 9. More particularly, the lattice element 8 is subjected to alternating bending operations in a manner such that the quadrilateral opening's laterally extending parallel odd numbered diagonal lines $D_1, D_3, D_5, D_7, D_9$ . . . align with trough portions of the space core 9, while the remaining even numbered diagonal lines $D_2, D_4, D_6, D_8$ . . . thereof align with ridge portions of the space core 9. In the alternating bending operations described above, it is possible to vary their bending angles in order to have the space core 9 form a curved surface.

The corrugated lattice-like space core 9 has its opposite sides embedded in cement mortar which will form a board-like member 10. By curing the cement, it is possible to automatically connect the space core 9 with the board-like member 10, which makes it possible to construct a space truss composite panel.

FIGS. 39 to 49 show a fifth embodiment of the present invention. In this embodiment, a straight member 11 is bent into a corrugated shape to form a corrugated member 12 which forms the essential component of the fifth embodiment of the present invention. Preferably, the corrugated member 12 does not form any sharp corner at the intersections of its oblique side portions 12a, 12a, or at all its bent portions. These bent portions should be rounded, or flattened by a length substantially equal to a diameter of wire rod or straight member 11. The remaining portions other than the bent portions are straight in shape.

The corrugated member 12 can be made of any material, for example such as metals, synthetic resins, FRP, reinforced concrete, reinforced fiber-cement and the like, provided that the material is capable of being shaped. Further, the corrugated member 12 may assume any desired shape in cross section, for example, as is in pipes, round bars, square bars, angle bars, H beams, strands, bind wires, and the like.

The corrugated member 12 is so disposed as to have its corrugation forming surface be vertical. The corrugated members 12, 12 intersect at their bent portions at right angles to form a space core 13. The corrugated member 12 may be cut into a piece of a desired length. The thus cut pieces of the corrugated member 12 may be connected with each other at node points. It is possible for the corrugated member 12 to have its corrugation forming surface inclined within a range of such intersected corrugation. It is also possible for the corrugated members 12, 12 extending in two directions to have their intersection angle have any value in addition to right angles. Further, by varying such corrugation in corrugation angle or in corrugation size, it is also possible for the corrugated lattice-like space core 13 to have a curved surface.

Opposite surfaces of the corrugated lattice-like space core 13 are embedded in cement mortar which is formed into a board-like member 14. When the cement is cured, the space core 13 is automatically connected with the board-like member 14 to form a space truss composite panel.

FIGS. 50 to 55 show a sixth embodiment of the present invention. This embodiment is a modification of the fifth embodiment shown in FIGS. 39 to 49. In the sixth embodiment of the present invention, additional straight members 15 are disposed on the intersections of the diagonal lines of the corrugated unit lattices in the above-mentioned space core 13, and cross each other at right angles. Consequently, by binding the corrugated member 12 and the straight members 15 together at their intersections in which the corrugated member 12 and the straight members 15 are vertically stacked together, a space truss framework 16 is formed.

By combining the corrugated member 12 with the straight members 15, the space truss is facilitated in its assembly work. Further, since all the members disposed on the node points are vertically stacked, it is possible to minimize the number of binded portions of the space truss framework thus constructed. Any binding means, for example such as welding, bonding, bolts, rivets and the like can be employed at the node points, provided that the means is capable of safely transmitting stress. Further, it is also possible for the space truss framework 16 to have its surface curved by varying its corrugation in angle and size.

As is in the corrugated member 12, the straight member 15 can be made of any material, for example such as metals, synthetic resins, FRP, reinforced concrete, fiber-reinforced cement, and the like. The straight member 15 may assume any shape in cross section as is in pipes, round bars, square bars, angle bars, H beams, strands, bind wires, and the like.

Figure 56:
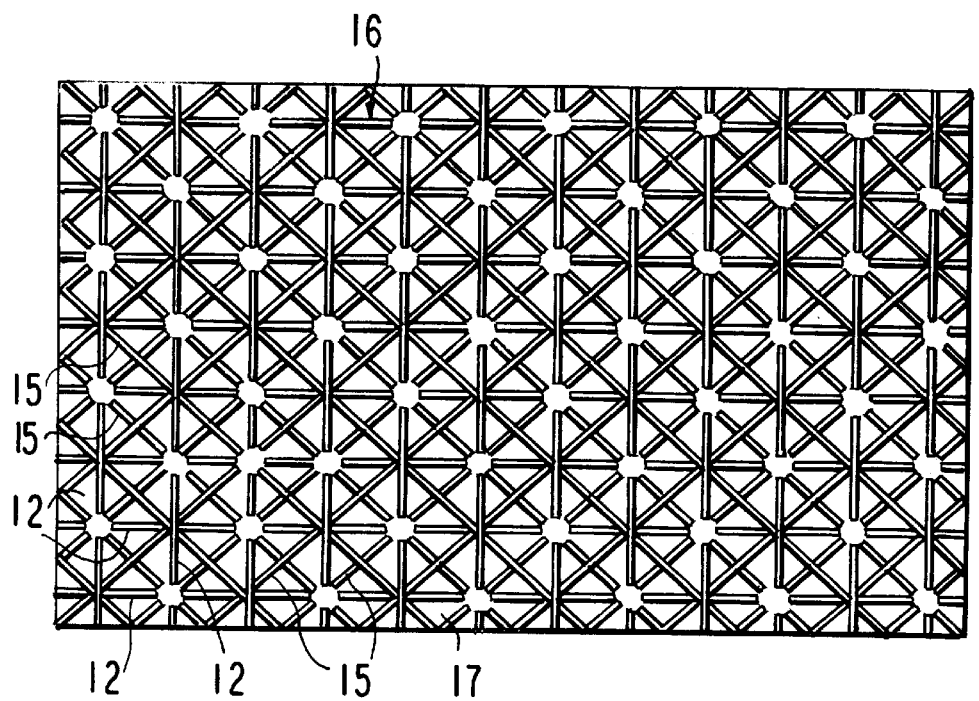
FIG. 56 is a front view of the space truss composite panel according to a seventh embodiment of the present invention.
Figure 57:
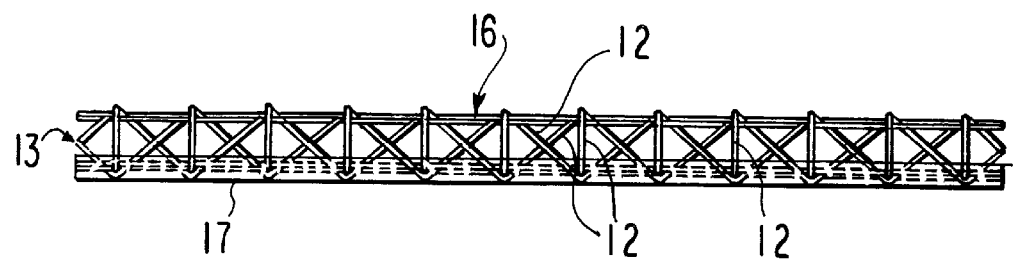
FIG. 57 is a bottom view of the space truss composite panel shown in FIG. 56.
Figure 58:
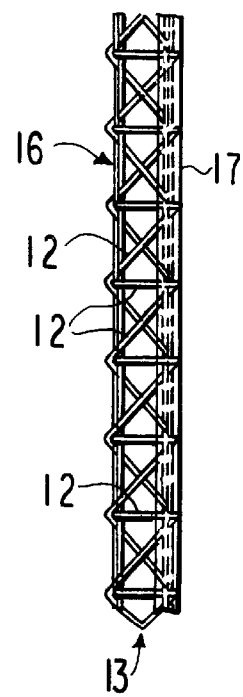
FIG. 58 is a right side view of the space truss composite panel shown in FIG. 56.
Figure 59:
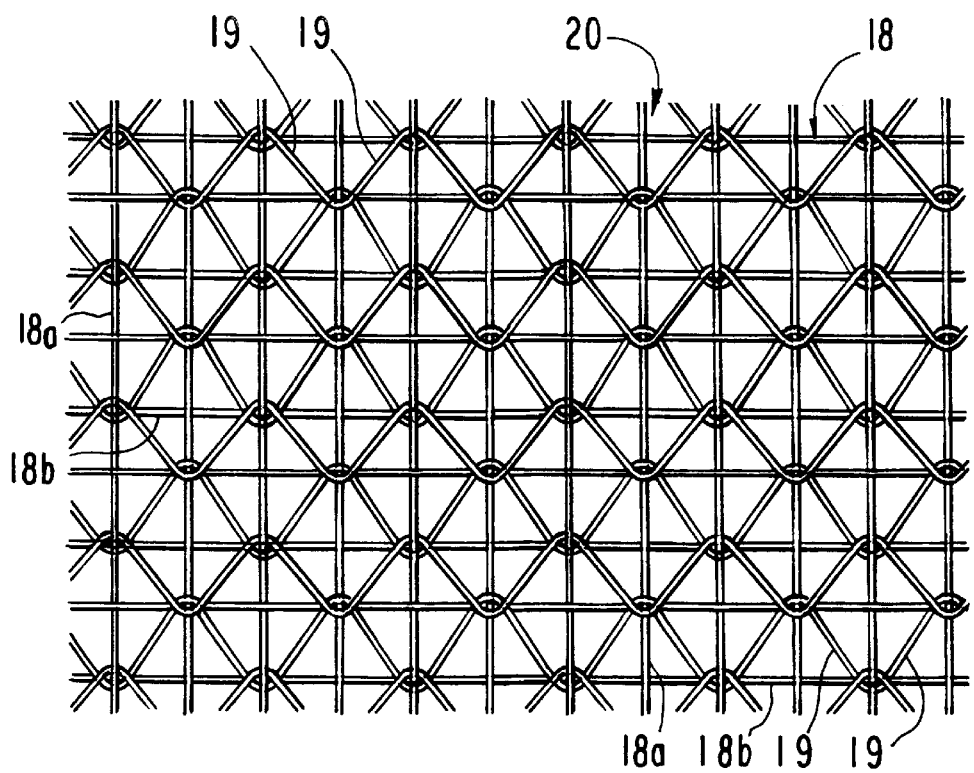
FIG. 59 is a front view of the space truss framework according to an eighth embodiment of the present invention.
Figure 60:
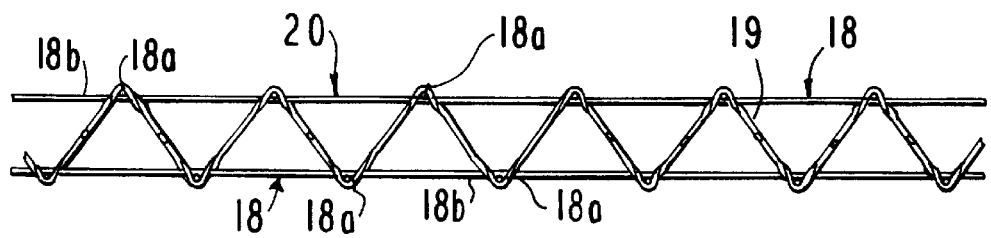
FIG. 60 is a bottom view of the space truss framework shown in FIG. 59.
Figure 61:
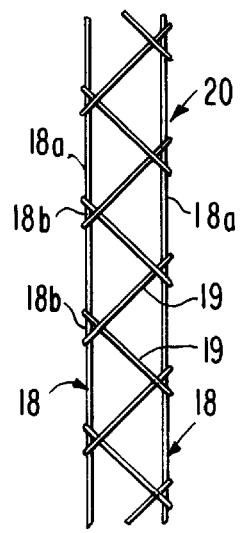
FIG. 61 is a right side view of the space truss framework shown in FIG. 59.
Figure 62:
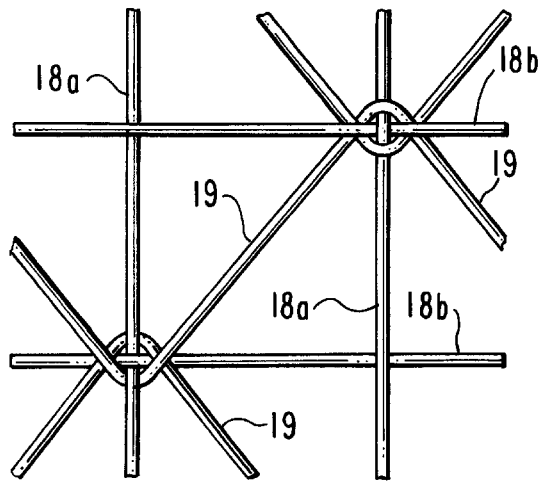
FIG. 62 is an enlarged front view of the essential part of the space core shown in FIG. 59.
Figure 63:
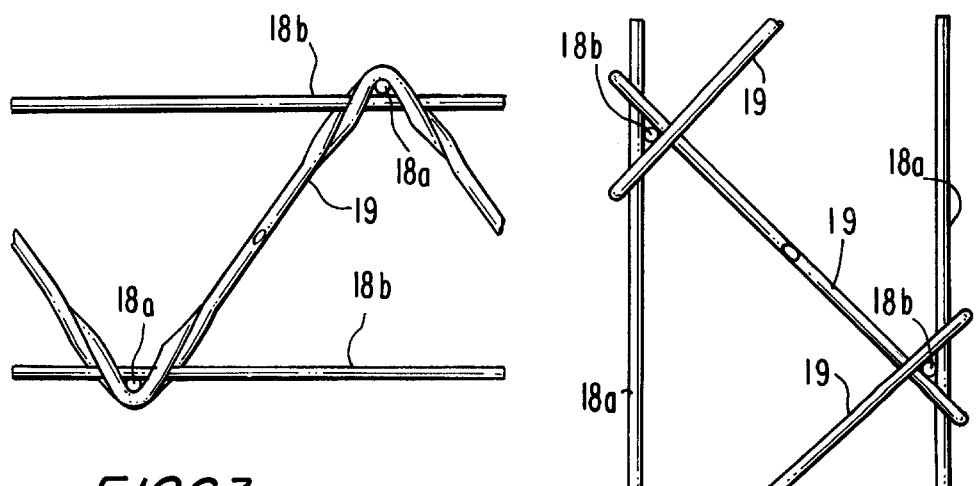
FIG. 63 is an enlarged bottom view of the essential part of the space core shown in FIG. 59.
Figure 64:
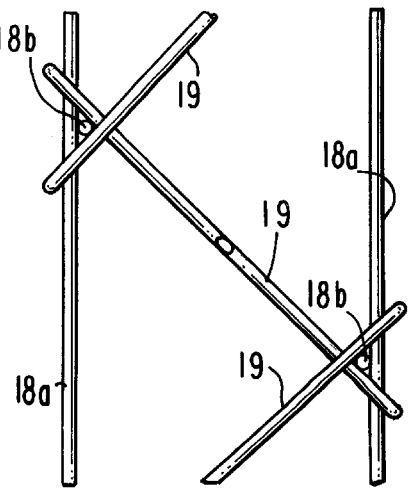
FIG. 64 is an enlarged right side view of the space core shown in FIG. 59.

FIGS. 56 to 58 show a seventh embodiment of the present invention. This embodiment is a modification of the sixth embodiment shown in FIGS. 50 to 55. In the seventh embodiment, the space truss framework 16 has its one side embedded in cement mortar which is formed into a board-like member 17. When the cement is cured, the space truss framework 16 is automatically connected with the board-like member 17 to form a space truss composite panel. It is possible to remove some of the straight members 15, the some being disposed in such embedded portions of the space truss framework 16.

FIGS. 59 to 64 show an eighth embodiment of the present invention. In this embodiment, a longitudinal fiber 18a and a lateral fiber 18b each using a steel wire are moved to one side out of alignment by ½ pitch, respectively, thereby forming a two-decker planar lattice construction in which an upper and a lower one of planar lattices 18, 18 are vertically stacked together. Then, an additional fiber 19 is obliquely knitted with the upper and lower longitudinal fibers 18a, 18a so as to connect them, and further knitted with the upper and lower lateral fibers 18b, 18b so as to connect them, thereby forming a space truss framework 20. Each of the longitudinal fiber 18a, lateral fiber 18b and the additional or oblique fiber 19 can be constructed of any one of filaments, fiber bundles, and strands. The fiber can be made of any material, for example such as metals, ceramics, carbon, synthetic resins, materials of which animals and plants are made, and the like. Soft ones of the fibers are cured or hardened by means of a binder or through a heat treatment.

Figure 67:
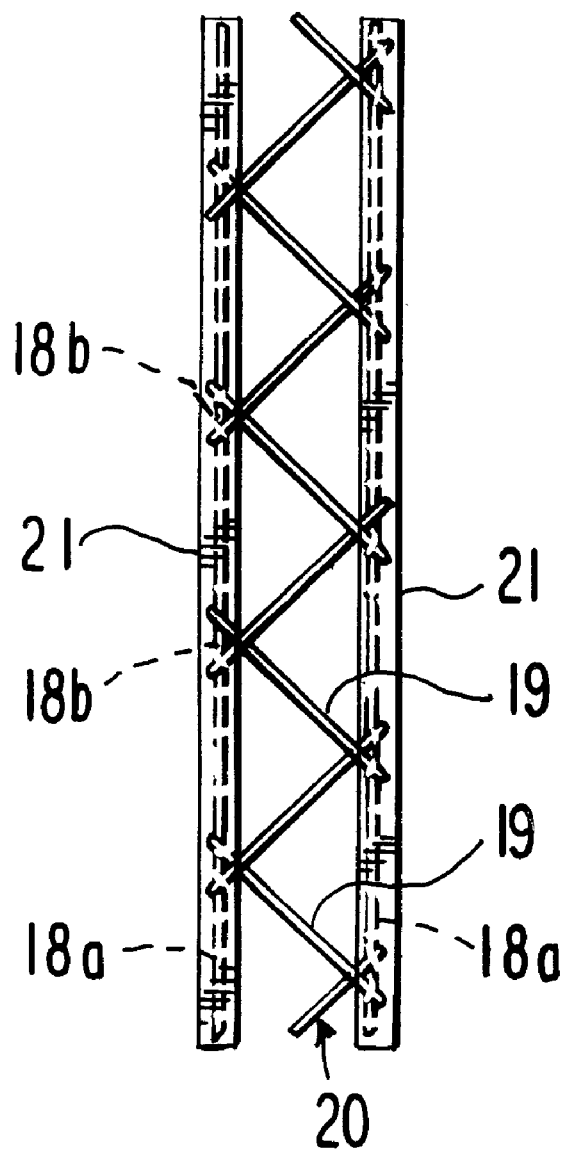
FIG. 67 is a right side view of the space truss composite panel shown in FIG. 65.

FIGS. 65 to 67 show a ninth embodiment of the present invention. This embodiment is a modification of the eighth embodiment shown in FIGS. 59 to 64. In the ninth embodiment, opposite sides of the above-mentioned space truss framework 20 are embedded in cement mortar which is formed into board-like members 21. When the cement is cured, the space truss framework 20 is automatically connected with the board-like members 20, thereby forming a space truss composite panel.

FIGS. 68 to 69 show a tenth embodiment according to a third and a fourth aspects of the present invention. In this embodiment, a lattice element 8 composed of a series of hexagonal unit lattices is subjected to a bending operation along each of diagonal lines of the hexagonal unit lattices, thereby forming a corrugated lattice-like space core 9. This space core 9 is a triangular pyramid space truss in which each of an upper and a lower horizontal member forms a triangular lattice.

Figure 70A:
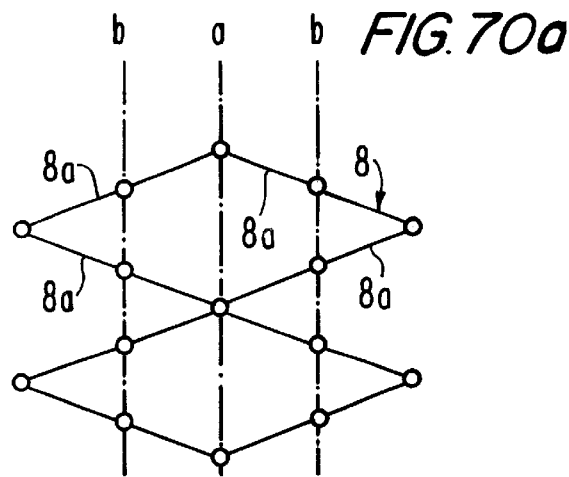
FIG. 70($a$) is a front view of the lattice element used in an eleventh embodiment of the present invention.
Figure 70C:
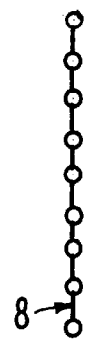
Figure 70B:
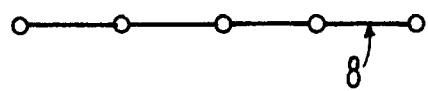
Figure 71A:
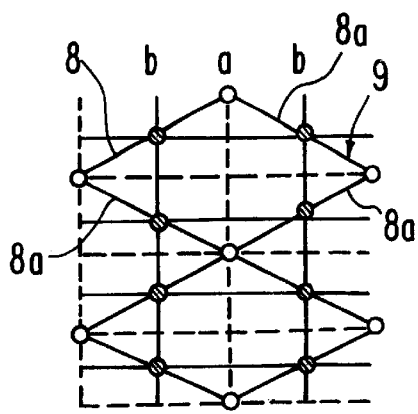
FIG. 71($a$) is a front view of the space core fabricated through the bending operation of the lattice element shown in FIG. 70($a$)
Figure 71B:
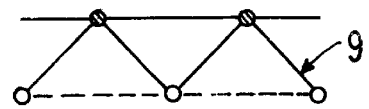
Figure 71C:
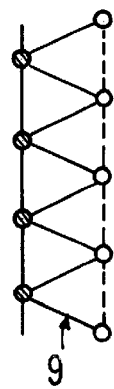

FIGS. 70 and 71 show an eleventh embodiment according to a third and a fourth aspect of the present invention. In this embodiment, a lattice element 8 composed of a series of quadrilateral unit lattices is bent along "a" and "b" lines, thereby forming a corrugated lattice-like space core 9. This space core 9 is a quadrilateral pyramid space truss in which each of an upper and a lower horizontal member forms a quadrilateral lattice.

Figure 33:
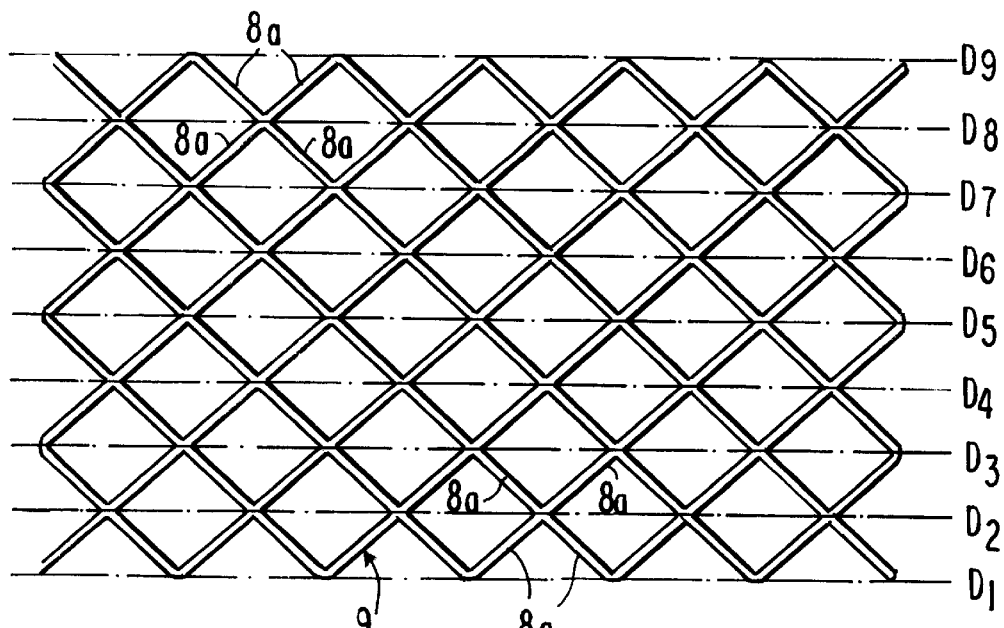
FIG. 33 is a front view of the space core formed through the bending operation of the lattice element shown in FIG. 32.
Figure 34:
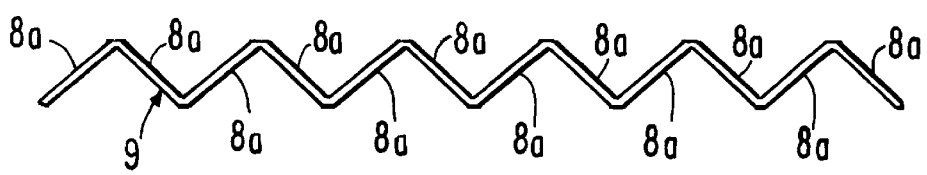
FIG. 34 is a bottom view of the space core shown in FIG. 33.
Figure 35:
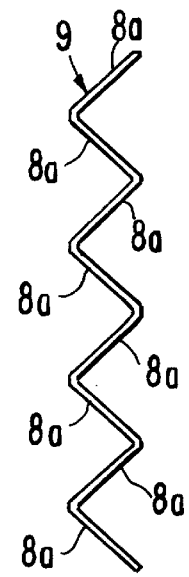
FIG. 35 is a right side view of the space core shown in FIG. 33.
Figure 36:
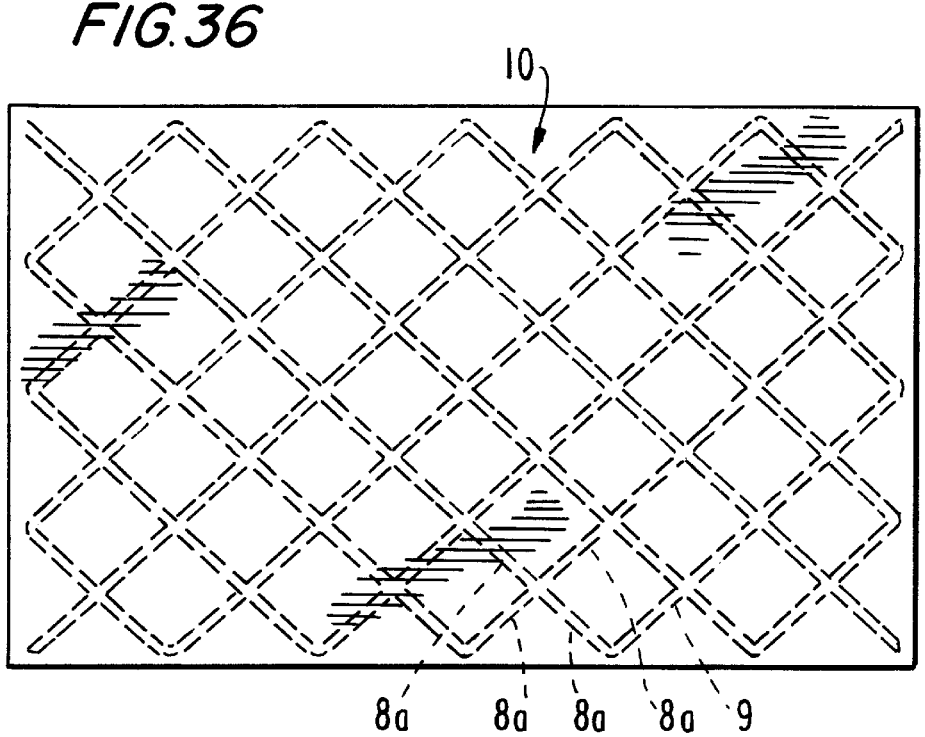
FIG. 36 is a front view of the space truss composite panel in which the space core shown in FIG. 33 is connected with the board-like member.
Figure 37:
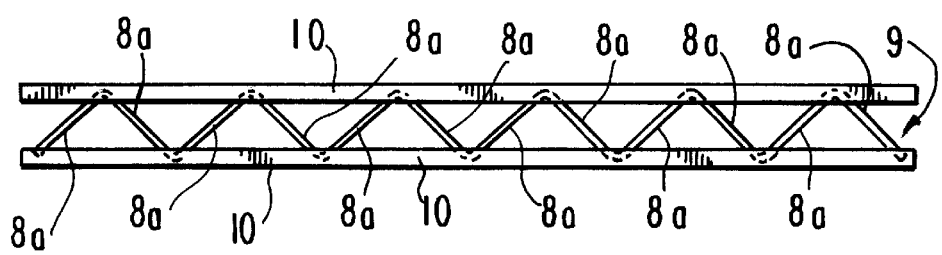
FIG. 37 is a bottom view of the space truss composite panel shown in FIG. 36.
Figure 41:
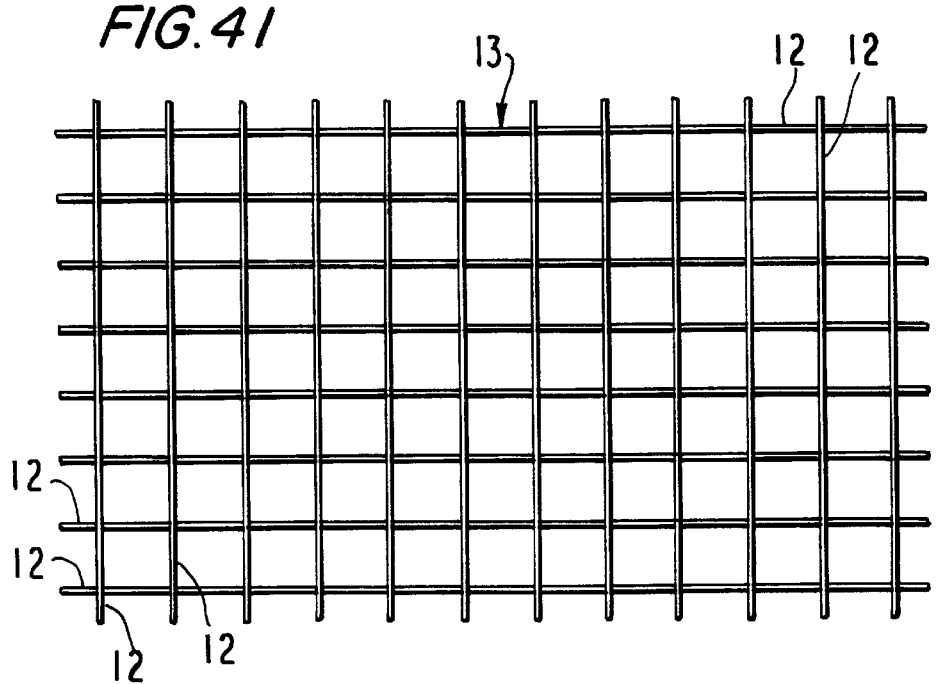
FIG. 41 is a front view of the space core formed by disposing the corruaged members of FIG. 39 so as to extend in two directions.
Figure 42:
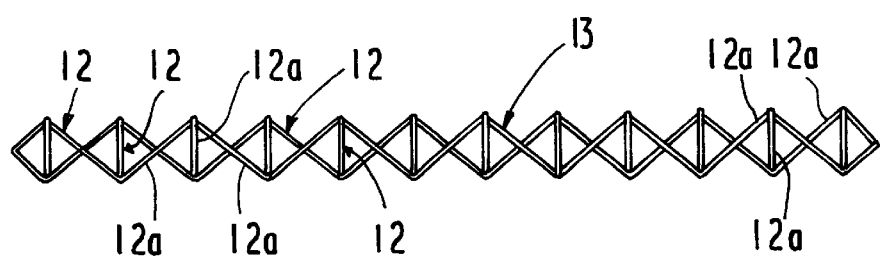
FIG. 42 is a bottom view of the space core shown in FIG. 41.
Figure 43:
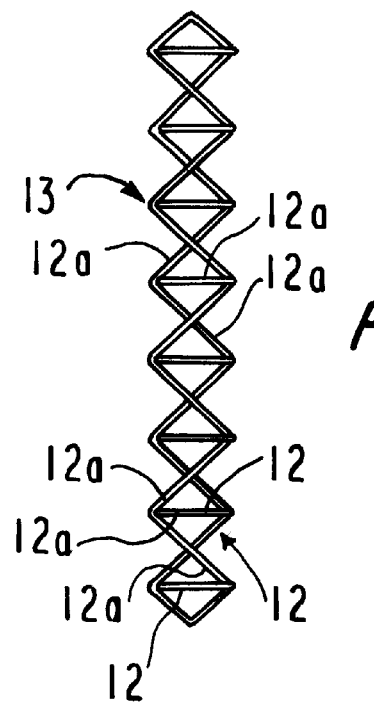
FIG. 43 is a right side view of the space core shown in FIG. 42.
Figure 44:
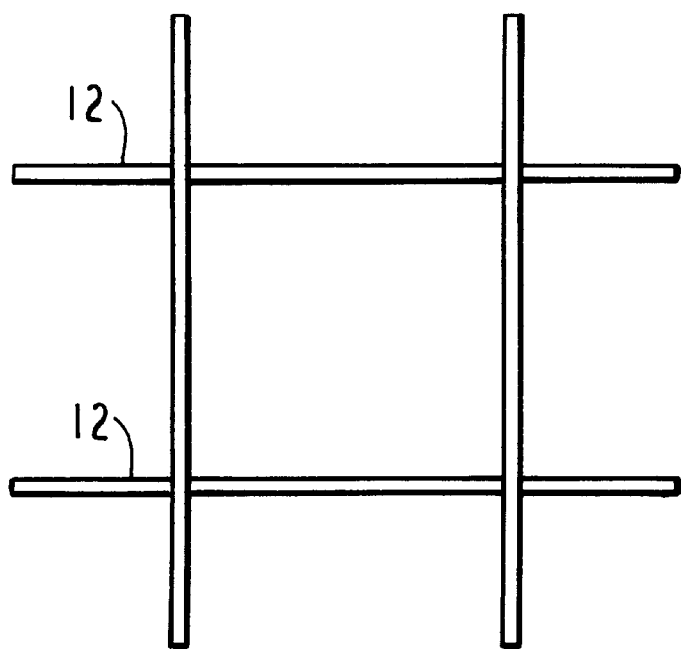
FIG. 44 is an enlarged front view of the essential part of the space core shown in FIG. 41.
Figure 45:
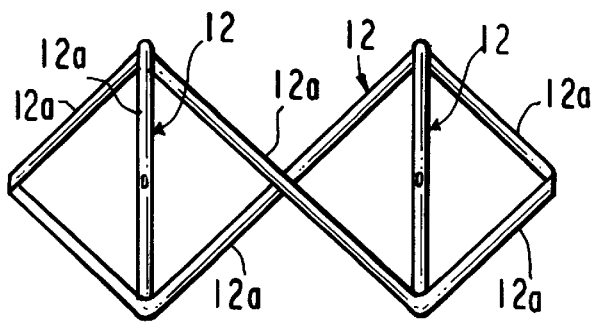
FIG. 45 is an enlarged bottom view of the essential part of the space core shown in FIG. 41.
Figure 46:
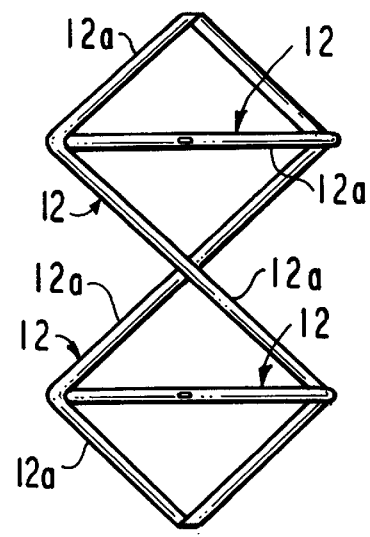
FIG. 46 is an enlarged right side view of the essential part of the space core shown in FIG. 41.
Figure 47:
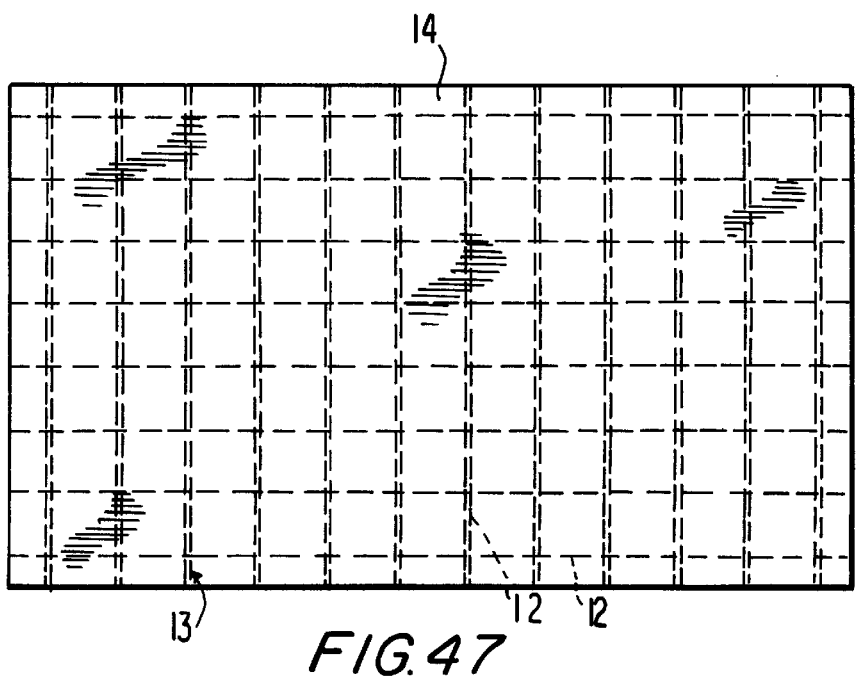
FIG. 47 is a front view of the space truss composite panel in which the space core shown in FIG. 41 is connected with the board-like member.
Figure 48:
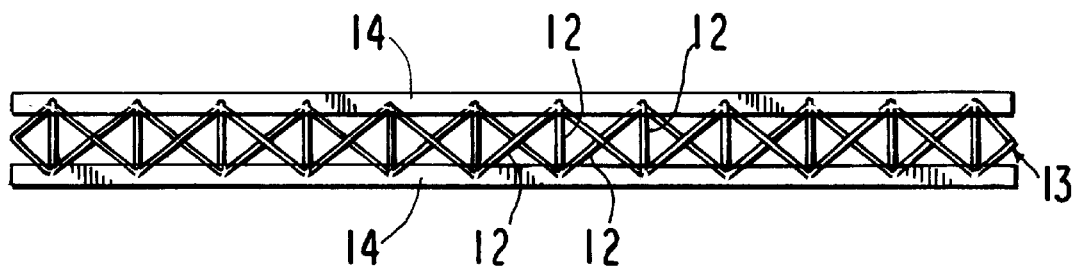
FIG. 48 is a bottom view of the space truss composite panel shown in FIG. 47.
Figure 49:
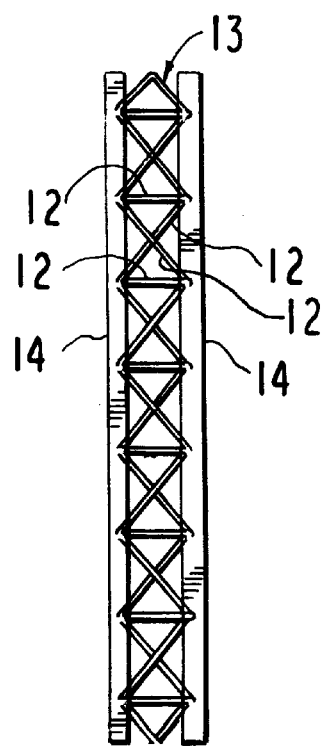
FIG. 49 is a right side view of the space truss composite panel shown in FIG. 47.
Figure 50:
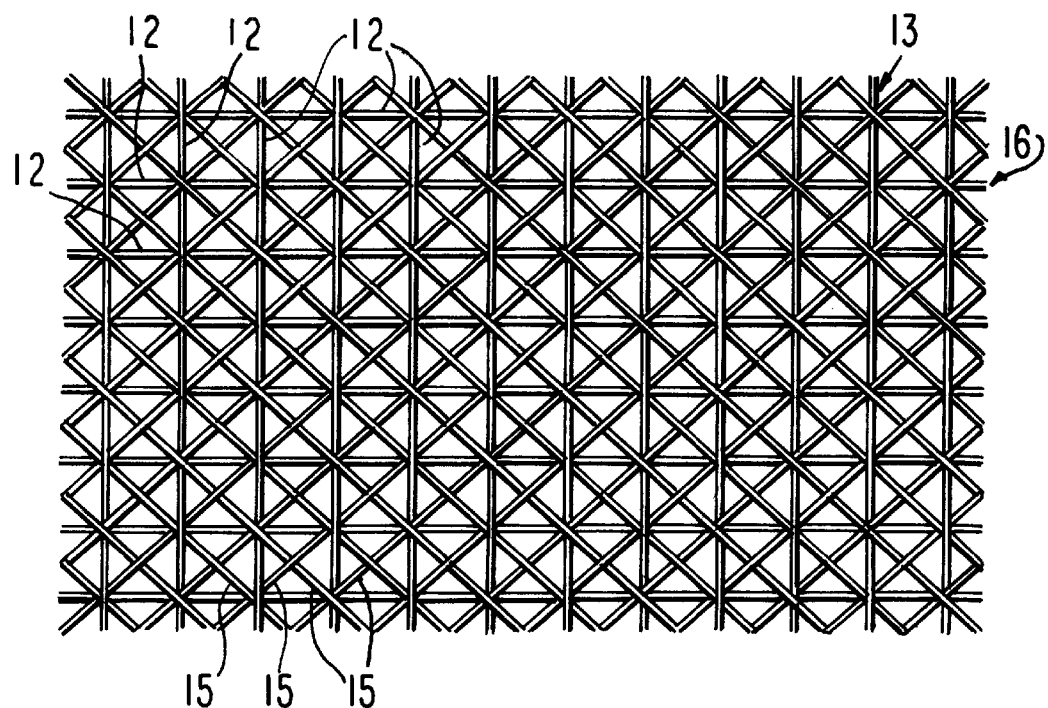
FIG. 50 is a front view of the space truss framework according to a sixth embodiment of the present invention.
Figure 51:
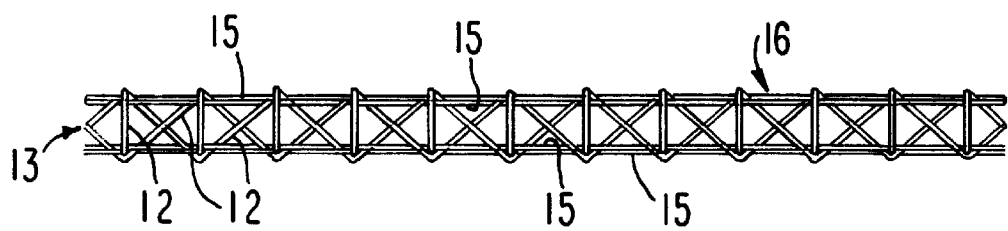
FIG. 51 is a bottom view of the space truss framework shown in FIG. 50.
Figure 52:
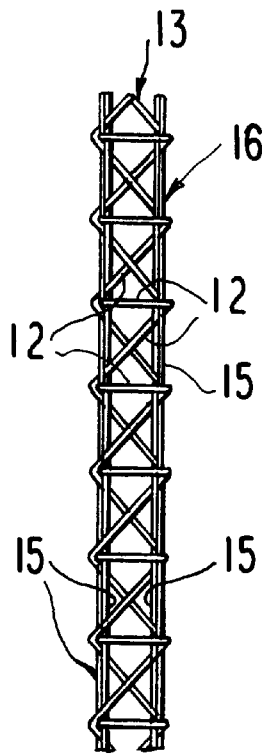
FIG. 52 is a right side view of the space truss framework shown in FIG. 50.
Figure 53:
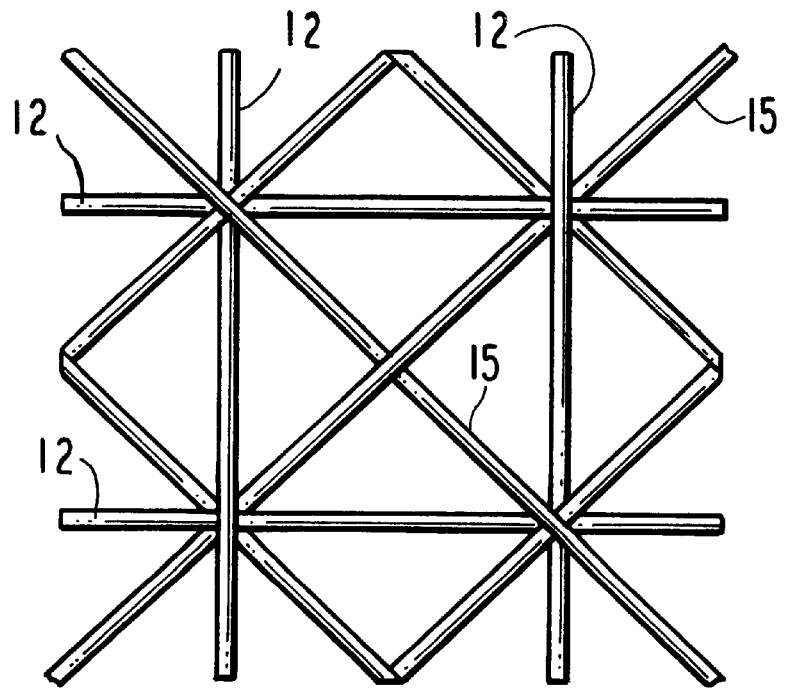
FIG. 53 is an enlarged front view of the essential part of the space core shown in FIG. 50.
Figure 54:
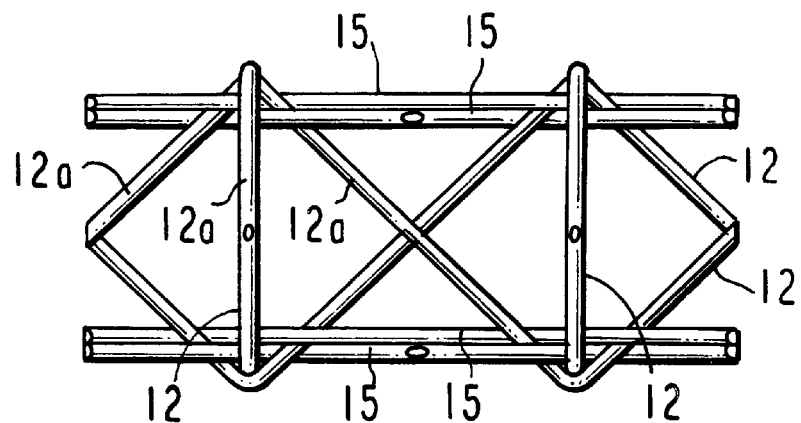
FIG. 54 is an enlarged bottom view of the essential part of the space core shown in FIG. 50.
Figure 55:
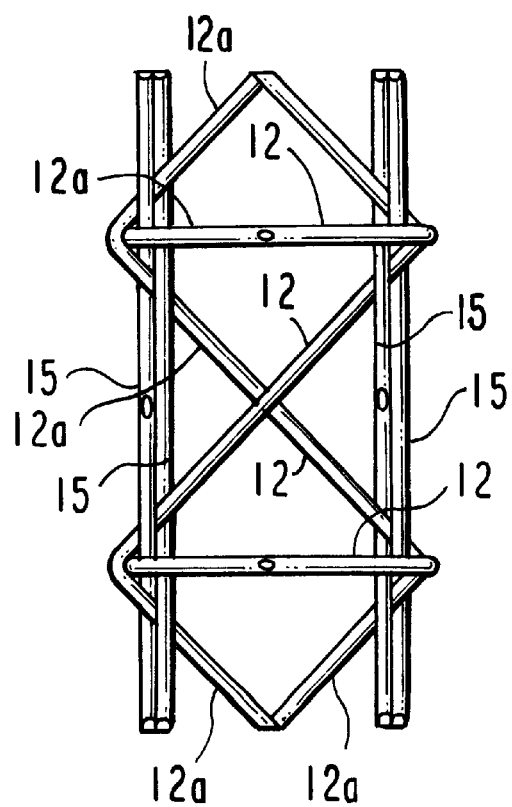
FIG. 55 is an enlarged right side view of the space core shown in FIG. 50.

When the lattice element 8 shown in FIG. 70 is bent only along the "a" line, the same space core as that of the fourth embodiment shown in FIGS. 33 to 35 is produced. When the lattice element 8 shown in FIG. 70 is bent only along the "b" lines, it is also possible to produce a corrugated lattice-like core which forms a modified space truss.

As in the above cases, the lattice element 8 is bent in a desired position such as intersection portions or side portions of the unit lattice even when the unit lattice is formed into either a quadrilateral shape or a hexagonal shape, thereby forming various types of the space core 9.

As material for the board-like member used in the space truss composite panel of the present invention, it is possible to employ any suitable material, for example such as: cement; gypsum; limes; clays; mixtures capable of solidifying due to their binder made of synthetic resins and like components; fluid materials such as liquid synthetic resins, molten metals, molten glass, and like fluid materials; and, the like. As for the mixtures and the fluid materials both described above, it is possible to mix them with any additional material such as reinforcing fibers, reinforcing bars, nets, lattices, sheets and the like. It is also possible to insert these additional materials into the mixtures with the fluid materials. Further, as for the face members composed of various materials such as paper, fabrics, nonwoven fabrics, nets, lattices, sheets, plates, and like materials, it is possible to connect them together through fastening, bonding, welding, or like methods.

It is possible to produce a multi-layer space truss composite panel by stacking and connecting together a plurality of the space truss composite panels of the present invention. Further, it is also possible to combine a plurality of the corrugated lattices with each other in the same cross section in use.

In the first and the second embodiment according to a first aspect of the present invention, the space framework 3 is produced as an integral entity from the outset by pressworking the slit sheet. Consequently, no assembly work for framework components is inherently required. Due to this, it is possible to efficiently and economically produce the space framework 3 by employing an automatized machine.

When the space framework 3 has one or both of its opposite sides connected with the boad-like member 4 to form the space truss composite panel, the ridgelines 3b of adjacent ones of the polygonal pyramids are connected with each other at the intersections of the adjacent side portions 3a, 3a of the polygonal unit lattices and to the flat vertex portions 3c. Due to this configuration, it is possible to obtain a truss construction excellent in dynamics. Furthermore, since the polygonal ridgeline portions 3b are continuously formed over the entire area of the space truss composite panel, the panel is free from any local weakness, and, is therefore excellent in structural strength.

In the third embodiment according to a second aspect of the present invention, the space core 6 is produced as an integral entity from the outset by bending the lattice element 5, such as the sheet of punching metal provided with the triangular openings. Consequently, no assembly work for core components is inherently required. Due to this, it is possible to efficiently and economically produce the space core 6 by employing an automatized machine.

When the space core 6 has one or both of its opposite sides connected with the board-like member 7 to form the space truss composite panel, four opposite side portions 5b shared by adjacent six of the triangles are connected with each other on the lattice lines to form the ridgeline portions of the quadrilateral pyramids. Due to this, it is possible to provide a truss construction excellent in dynamics. Furthermore, since the quadrilateral ridgeline portions are continuously formed over the entire area of the space truss composite panel, the panel is free from any local weakness, and is therefore excellent in structural strength.

In the fourth embodiment according to a third and a fourth aspects of the present invention, the space core 9 is produced as an integral entity from the outset by bending the lattice element 8 such as the sheet of expanded metal provided with quadrilateral openings or hexagonal openings. Consequently, no assembly work for core components is inherently required. Due to this, it is possible to efficiently and economically produce the space core 9 by employing an automatized machine.

When the space core 9 has one or both of its opposite sides connected with the boad-like member 10 to form the space truss composite panel, four side portions 8a shared by adjacent four of the quadrilaterals, or three side portions 8a shared by adjacent three of the hexagons are connected with each other on the diagonal lines to form the ridgeline portions of the quadrilateral pyramids or of the triangular pyramids. Due to this, it is possible to provide a truss construction excellent in dynamics. Furthermore, since the quadrilateral ridgeline portions or the triangular ridgeline portions are continuously formed over the entire area of the space truss composite panel, the panel is free from any local weakness, and, is therefore excellent in structural strength.

In the fifth embodiment according to a fifth aspect of the present invention, the space core 13 is produced in a manner such that: the corrugated member 12 is so disposed as to have its corrugation forming surface be vertical; and, the corrugated members 12, 12 intersect at their bent portions at right angles to form a space core 13. In the thus formed space core 13, adjacent four of the oblique side portions 12a form the ridgeline portions of the quadrilateral pyramids at the intersection portions. Due to this, it is possible to provide a truss construction excellent in dynamics. Furthermore, since the quadrilateral ridgeline portions are continuously formed over the entire area of the space truss composite panel, the panel is free from any local weakness, and, is therefore excellent in structural strength.

Further, the corrugation's bent portions, which form the intersection portions of the corrugated members 12, 12, are disposed in the same plane in both of a front and a rear side of the space core 13. Due to this, in connecting the opposite sides of the space core 13 with the board-like members 14, it is possible to embed the opposite sides or surfaces of the space core 13 in the mixtures or fluid materials such as cement mortar and the like, and connect them with each other through solidification of the mixture of fluid materials. Due to this, it is possible to connect the corrugated members with each other, and also possible to connect them with the board-like members 14 in a simple manner without fail, which improves productivity in factories and reduces manufacturing costs.

In the sixth embodiment according to a sixth aspect of the present invention, the space core 13 is produced in a manner such that: the corrugated member 12 is so disposed as to have its corrugation forming surface be vertical; and, the corrugated members 12, 12 extending in two directions intersect at their bent portions to form the space core 13. In the thus formed space core 13: adjacent four of the oblique side portions 12a form the ridgeline portions of the quadrilateral pyramids at the intersection portions; and, additional straight members extending in two directions are also disposed so as to connect the vertexes lying on the diagonal lines of the corrugated lattice, thereby connecting all the intersections. Due to this, it is possible to provide a truss construction, which is further improved in dynamics. Furthermore, since the quadrilateral ridgeline portions are continuously formed over the entire area of the space truss composite panel, the panel is free from any local weakness, and is therefore excellent in structural strength.

In the seventh embodiment according to a seventh aspect of the present invention, the corrugation's bent portions, which are the intersection portions of the corrugated members 12 and also the connection portions formed between the corrugated member 12 and the additional straight member 15, are disposed in the same plane in each of the front and the rear side of the space truss framework 16. Due to this, in connecting the framework 16 with the board-like member 17 in one side or both sides of the framework 16, when the mixtures or fluid materials such as cement mortar capable of solidifying is used to have the side or sides of the framework 16 embedded therein, it is possible to connect the corrugated member with the additional straight member 15 and with the board-like member 17 in a simple manner without fail, which improves productivity in factories and reduces manufacturing costs, and further impoves the space truss composite panel in structural strength.

In the eighth embodiment according to an eighth aspect of the present invention, the upper and the lower planar lattices 18, 18, each of which is formed by crossing the longitudinal fiber 18a and the lateral fiber 18b or by crossing warp and woof, are vertically spaced apart from each other. Then, the additional oblique fiber 19 or oblique thread is knitted with the upper and lower longitudinal fibers 18a, 18a to connect adjacent three intersections of the upper and lower planar lattices 18 into a triangle pattern. Due to this, the fibers or threads are increased in rigidity, which makes it possible to produce the space truss framework excellent in dynamics.

In the ninth embodiment according to a ninth aspect of the present invention, the upper and the lower planar lattices 18, 18, each of which is composed of the longitudinal fiber 18*a* and the lateral fiber 18*b*, are vertically spaced apart from each other. Then, three adjacent intersections of the upper and the lower planar lattices 18, 18 are connected by means of the oblique fiber 19 in a manner such that adjacent three intersections of the upper and lower planar lattices 18, 18 are connected with each other to form a triangle pattern. Due to this, the fibers are increased in rigidity in the space truss framework 20 thus constructed. Since the framework 20 has one or both of its opposite sides connected with the board-like member 21, it possible to provide the space truss composite panel excellent in dynamics.

As described above, in the present invention, since the space framework or the space core is produced as an integral entity from the outset, or since the connection points between their components are in the same plane in the front side or in the rear side, any connection operation for these components is not required at all, or can be conducted smoothly without fail. Due to this, it is possible for the industry to easily and economically produce the space truss framework and the space truss composite panel even when these framework and panel is extremely low in height. Consequently, it is possible to maximize the utilization of the space truss which is excellent in structural mechanics and in utility in various industrial fields as to furniture, containers, the bodies of vehicles, the hulls of vessels, the hulls of airplanes and the like.

The space truss composite panel of the present invention is lighter in weight and greater in strength than any other types of the conventional composite panel. We believe that the space truss composite panel of the present invention finds a new industrial field, and the industry is improved in productivity in producing the products of this panel in a wide application area of these products.

What is claimed is:

1. A space truss composite panel having a construction in which a sheet (1) is provided with a series of slits (2) and is formed into a space framework (3) by a press working step, said space framework (3) being provided with a series of polygonal unit lattices in one of its opposite sides and a series of polygonal pyramids in the other of said opposite sides, wherein each of said polygonal unit lattices has an intersection of its adjacent sides (3*a*, 3*a*) connected with multiple stretched and angled ridgeline portions (3*b*) of each of said polygonal pyramids which has a flat vertex portion (3*c*), each said flat vertex portion (3*c*) having at least one triangular shaped fin (3*d*) extending laterally therefrom, and said space framework (3) has each said flat vertex portion (3*c*) connected with a board member (4).

2. The space truss composite panel according to claim 1, wherein said sheet (1) and said board member (4) are each a press workable metal.

3. The space truss composite panel according to claim 1, wherein said board member (4) is a steel plate connected to said flat vertex portions (3*c*) of said polygonal pyramids.

4. The space truss composite panel according to claim 1, wherein said polygonal unit lattices each have a quadrilateral shape.

5. The space truss composite panel according to claim 1, wherein said polygonal unit lattices each have a hexagonal shape.

6. The space truss composite panel according to claim 3, wherein said flat vertex portions (3*c*) of said space framework (3) are connected to said board member (4) by welding to produce a composite panel.

7. The space truss composite panel according to claim 1 wherein said polygonal lattices each have a triangular shape.

8. The space truss composite panel according to claim 1, wherein said sheet (1) is a plastic synthetic resin material.

9. The space truss composite panel according to claim 1, wherein said board member (4) is connected to said polygonal unit lattices of said space framework (3) to form a honeycomb sandwich panel.

* * * * *